(12) United States Patent
Chaen et al.

(10) Patent No.: US 10,265,661 B2
(45) Date of Patent: Apr. 23, 2019

(54) MIXED POWDER AND MATERIAL FOR MOLDING HAVING PTFE AS MAIN COMPONENT, AND DRAWN POROUS BODY

(71) Applicant: DAIKIN INDUSTRIES, LTD., Osaka-shi, Osaka (JP)

(72) Inventors: Shinichi Chaen, Settsu (JP); Hideyuki Kiyotani, Settsu (JP); Kunihiko Inui, Settsu (JP); Taku Yamanaka, Settsu (JP); Li Bao, Yuki (JP); Yoshiyuki Shibuya, Settsu (JP); Seigo Yamamoto, Settsu (JP); Makoto Kobayashi, Yuki (JP); Shunji Kasai, Settsu (JP); Hitoshi Niinuma, Yuki (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/612,678

(22) Filed: Jun. 2, 2017

(65) Prior Publication Data

US 2018/0065094 A1    Mar. 8, 2018

Related U.S. Application Data

(62) Division of application No. 14/394,946, filed as application No. PCT/JP2013/061685 on Apr. 19, 2013, now Pat. No. 9,707,504.

(30) Foreign Application Priority Data

Apr. 20, 2012   (JP) ................................. 2012-096510
Mar. 31, 2013   (JP) ................................. 2013-075534

(51) Int. Cl.
*B01D 53/22*  (2006.01)
*B01D 71/36*  (2006.01)
(Continued)

(52) U.S. Cl.
CPC ......... *B01D 71/36* (2013.01); *B01D 46/0001* (2013.01); *B01D 46/0019* (2013.01);
(Continued)

(58) Field of Classification Search
CPC ....... C08L 27/18; B32B 27/322; B01D 71/36; B01D 46/543; B01D 46/0001; B29K 2105/0005
See application file for complete search history.

(56) References Cited

U.S. PATENT DOCUMENTS 4,129,470 A * 12/1978 Homsy ................. A61L 27/443
                                                          156/155
4,451,616 A *  5/1984 Kawachi ................. C08J 3/005
                                                           264/127
(Continued)

FOREIGN PATENT DOCUMENTS

CN         87105333 A      2/1988
CN         1842574 A      10/2006
(Continued)

OTHER PUBLICATIONS

International Search Report of corresponding PCT Application No. PCT/JP2013/061685, dated Jul. 9, 2013.
(Continued)

*Primary Examiner* — Anthony R Shumate
(74) *Attorney, Agent, or Firm* — Global IP Counselors, LLP

(57) ABSTRACT

A mixed powder and a material for molding have polytetrafluoroethylene as a main component. Each includes polytetrafluoroethylene that can be fibrillated, a non-hot melt processable component that is not fibrillated, and a hot melt processable component with a melting point of lower than 320° C. that is not fibrillated. The non-hot melt processable component that is not fibrillated is contained in a range of 20
(Continued)

to 40% by weight of the total weight. The hot melt processable component is contained at equal to or more than 0.1% by weight but less than 20% by weight of the total weight. A drawn porous body includes a plurality of fibrils, and a plurality of knotted portions that are connected to each other by the fibrils.

7 Claims, 8 Drawing Sheets

(51) Int. Cl.
| | |
|---|---|
| B32B 27/32 | (2006.01) |
| C08L 27/18 | (2006.01) |
| B01D 46/00 | (2006.01) |
| B01D 46/54 | (2006.01) |
| B29D 7/01 | (2006.01) |
| B29D 99/00 | (2010.01) |
| C08K 3/36 | (2006.01) |
| C08L 83/04 | (2006.01) |
| B29K 27/18 | (2006.01) |
| B29K 105/00 | (2006.01) |

(52) U.S. Cl.
CPC ............ *B01D 46/543* (2013.01); *B29D 7/01* (2013.01); *B29D 99/005* (2013.01); *B32B 27/322* (2013.01); *C08K 3/36* (2013.01); *C08L 27/18* (2013.01); *C08L 83/04* (2013.01); *B29K 2027/18* (2013.01); *B29K 2105/0005* (2013.01); *C08L 2205/025* (2013.01); *C08L 2205/03* (2013.01)

(56) References Cited

U.S. PATENT DOCUMENTS

| | | | |
|---|---|---|---|
| 4,555,543 A | 11/1985 | Effenberger et al. | |
| 4,914,146 A | 4/1990 | Honda et al. | |
| 5,102,921 A | 4/1992 | Harada et al. | |
| 5,230,952 A * | 7/1993 | McCord | C08L 27/18 |
| | | | 188/251 A |
| 5,429,742 A | 7/1995 | Gutman et al. | |
| 5,527,353 A * | 6/1996 | Schmitt | C08L 67/00 |
| | | | 623/1.44 |
| 5,708,044 A | 1/1998 | Branca | |
| 5,814,405 A | 9/1998 | Branca et al. | |
| 6,417,280 B2 | 7/2002 | Effenberger et al. | |
| 6,521,284 B1 * | 2/2003 | Parsons | A61L 27/44 |
| | | | 427/2.24 |
| 7,008,465 B2 | 3/2006 | Graham et al. | |
| 2002/0001704 A1 | 1/2002 | Ruefer et al. | |
| 2003/0000187 A1 | 1/2003 | Kobayashi et al. | |
| 2003/0060871 A1 * | 3/2003 | Hill | A61F 2/07 |
| | | | 623/1.15 |
| 2004/0182511 A1 * | 9/2004 | Rakos | A61F 2/06 |
| | | | 156/287 |
| 2005/0177227 A1 * | 8/2005 | Heim | A61F 2/2412 |
| | | | 623/2.12 |
| 2006/0122333 A1 | 6/2006 | Nishio | |
| 2006/0293459 A1 | 12/2006 | Yoshimoto et al. | |
| 2008/0027534 A1 * | 1/2008 | Edwin | A61L 27/16 |
| | | | 623/1.44 |
| 2008/0302074 A1 * | 12/2008 | Gebert | B01D 39/1623 |
| | | | 55/521 |
| 2010/0030253 A1 | 2/2010 | Harris et al. | |
| 2012/0020773 A1 | 1/2012 | Herrmann | |
| 2013/0097982 A1 | 4/2013 | Inui et al. | |
| 2013/0108845 A1 * | 5/2013 | Tee | B01D 69/02 |
| | | | 428/206 |
| 2014/0142682 A1 * | 5/2014 | Radspinner | A61L 27/507 |
| | | | 623/1.15 |
| 2015/0082757 A1 * | 3/2015 | Chaen | B32B 27/322 |
| | | | 55/482 |
| 2015/0376482 A1 | 12/2015 | Bekemeier et al. | |
| 2016/0236132 A1 | 8/2016 | Hara et al. | |
| 2016/0296867 A1 | 10/2016 | Stark et al. | |

FOREIGN PATENT DOCUMENTS

| | | |
|---|---|---|
| CN | 101084257 A | 12/2007 |
| EP | 1661947 A1 | 5/2006 |
| JP | 3-17136 A | 1/1991 |
| JP | 10-505378 A | 5/1998 |
| JP | 2814574 B2 | 10/1998 |
| JP | 2000-143922 A | 5/2000 |
| JP | 2011-213857 A | 10/2011 |
| JP | 2012-20274 A | 2/2012 |
| WO | 2006060524 A2 | 6/2006 |
| WO | 2010036935 A1 | 4/2010 |

OTHER PUBLICATIONS

European Search Report of corresponding EP Application No. 16 17 2614.6 dated Nov. 30, 2016.
European Search Report of corresponding EP Application No. 13 77 8043,3 dated Oct. 29, 2015.
Process and Application of Fluoroplastics; cited in the Mar. 23, 2017 Office Action of corresponding Chinese Application; Jingyuan Miu; pp. 54 and 61; Oct. 1987; Chemical Industries Press, China.
Engineering Plastic Handbook; cited in the Mar. 23, 2017 Office Action of corresponding Chinese Application; Anfu Shi; pp. 964 and 965; Mar. 2003; Shanghai Scientific & Technical Publishers, China.
Fluorochemical Engineering Producing Technology (last volume); cited in the Oct. 16, 2017 Office Action of corresponding Chinese Application; Edited by Wei Hu; pp. 502 to 509 (505-507); Feb. 2010; Science Press, China.

* cited by examiner

MIXED POWDER AND MATERIAL FOR MOLDING HAVING PTFE AS MAIN COMPONENT, AND DRAWN POROUS BODY

CROSS-REFERENCE TO RELATED APPLICATIONS

This application is a divisional application of U.S. patent application Ser. No. 14/394,946 filed on Oct. 16, 2014, which is a National Stage application of International Patent Application No. PCT/JP2013/061685 filed on Apr. 19, 2013. The entire disclosure of U.S. patent application Ser. No. 14/394,946 is hereby incorporated herein by reference.

The present invention relates to mixed powder and a material for molding having PTFE as a main component, and a drawn porous body.

BACKGROUND ART

Manufacturing a semiconductor device or a liquid crystal display device is performed in a highly clean space. To create a highly clean space, a porous membrane composed of polytetrafluoroethylene (PTFE) (hereinbelow, also referred to as a "porous PTFE membrane") is used as a filter for collecting fine particles. From the viewpoint of having high efficiency for collecting fine particles compared to a filtering medium composed of glass fiber with the same pressure loss, the porous PTFE membrane is particularly preferably used for a HEPA filter (High Efficiency Particulate Air Filter) or a ULPA filter (Ultra low Penetration Air Filter).

As a HEPA filter, a filtering medium composed of glass fiber has been conventionally used. However, there is a problem that it has a high pressure loss. Meanwhile, a filter with a low pressure, which is achieved by applying the porous PTFE membrane to a filtering medium, has been also conventionally commercialized. However, there is a problem that, since a pressure loss easily increases due to an occurrence of surface filtration as caused by a dense structure of the porous PTFE membrane, the life span is equal to or less than half of a glass fiber filter.

In order to increase the life span, a filtering medium adhered with an MB (Melt Blown) non-woven fabric at upstream side of the porous PTFE membrane is also suggested. However, because the filtering medium thickness increases according to adhesion of MB non-woven fabric, and thus there is a problem that an area to which the folded filtering medium is inserted while it is incorporated into an air filter unit is reduced and also the price of the filtering medium increases.

With regard to a porous PTFE membrane of a related art, it is known that high air permeability is obtained by adding PTFE that is not fibrillated by drawing to PTFE that is fibrillated by drawing during manufacture (for example, see JP 10-505378 W and JP 2814574 B1). This porous PTFE membrane has fibrils and knotted portions that are connected to each other by fibrils. However, since the strength of the knotted portions is weak, the membrane structure changes as compressive force or the like is applied during a post step like laminating an air permeable support, and thus the filter performance such as a pressure loss, PF value, or filter life span may be deteriorated.

SUMMARY

Technical Problem

As having low mechanical strength, the PTFE molded article of a related art is easily affected by external force after being processed into a porous membrane. In particular, the influence is significant for a use in which a molded article with low filling rate (for example, 1 to 20%) is used. Further, although desired performances may be exhibited right after processing into a porous body (for example, the aforementioned porous membrane, a sheet used for a cushion material, packing, or the like), the structure with low filling rate is impaired due to external force applied thereto by post processing or the like, and thus there are many cases in which the performances of the molded article are deteriorated.

A purpose of the present invention is to provide mixed powder and a material for molding with which a molded article, which is difficult to be deformed by external force even at low filling rate, can be obtained.

Another purpose of the present invention is to provide a drawn porous body.

Inventors of the present invention conducted intensive studies to solve the aforementioned problems. As a result, they found that, when a composition having a hot melt processable component that is not fibrillated in addition to PTFE that is fibrillated by drawing and a non-hot melt processable component that is not fibrillated such as low molecular weight PTFE that is fibrillated is used and a porous membrane is prepared with it and applied to an air filter, for example, the structure of the porous PTFE membrane can be improved, and both of a low pressure loss and long life span can be satisfied. It is also found that, as the strength of the knotted portions is increased, a decrease in filter performance is suppressed even when compressive force or the like is applied during a post process like lamination of an air permeable support.

The present invention provides a mixed powder having polytetrafluoroethylene as a main component, the mixed powder containing polytetrafluoroethylene that can be fibrillated, a non-hot melt processable component that is not fibrillated, and a hot melt processable component with a melting point lower than 320° C. that is not fibrillated, the non-hot melt processable component that is not fibrillated being contained in a range of 20 to 40% by weight of a total weight of the mixed powder, and the hot melt processable component being contained at equal to or more than 0.1% by weight but less than 20% by weight of the total weight of the mixed powder.

The present invention also provides a material for molding having polytetrafluoroethylene as a main component, the material for molding containing polytetrafluoroethylene that can be fibrillated, a non-hot melt processable component that is not fibrillated, and a hot melt processable component with a melting point lower than 320° C. that is not fibrillated, the non-hot melt processable component that is not fibrillated being contained in a range of 20 to 40% by weight of a total weight of the material for molding, and the hot melt processable component being contained at equal to or more than 0.1% by weight but less than 20% by weight of the total weight of the material for molding.

The present invention also provides a drawn porous body containing a plurality of fibrils, and a plurality of knotted portions that are connected to each other by the fibrils. The fibrils includes polytetrafluoroethylene that can be fibrillated. The knotted portions includes polytetrafluoroethylene that can be fibrillated, a non-hot melt processable component that is not fibrillated, and a hot melt processable component with a melting point lower than 320° C. that is not fibrillated. The non-hot melt processable component that is not fibrillated is contained in a range of 20 to 40% by weight of a total weight of the drawn porous body, and the hot melt processable component is contained at equal to or more than 0.1% by weight but less than 20% by weight of the total weight of the drawn porous body.

Advantageous Effects of Invention

When a porous membrane is produced by using the composition or the like of the present invention, for example, the obtained porous membrane is unlikely to have deformation caused by external force even when the filling ratio of a molded article is low. For such reasons, when the produced porous membrane has low filling ratio but high air permeability, not only a filtering medium with a low pressure loss can be obtained by using it, but as the low density structure is maintained, the filter life span is also significantly improved so that the life span like a glass fiber filter can be achieved. Further, as the decrease in filter performance is suppressed even when compressive force or the like is applied in a post step like lamination of an air permeable support, fewer problems are caused during the manufacture.

Further, according to the present invention, a decrease in the collecting performance is suppressed even with high dust holding capacity, and therefore a filtering medium for an air filter and an air filter unit which does not generate impurities are obtained. Further, according to the manufacturing method of the present invention, a porous membrane used for a filtering medium for an air filter is obtained.

DESCRIPTION OF EMBODIMENTS

First Embodiment

Hereinbelow, the composition, mixed powder, material for molding (these three may be also collectively referred to as a composition or the like), porous membrane, filtering medium for a filter, air filter unit, and method for manufacturing a porous membrane according to the first embodiment are described. The composition or the like is described in conjunction with the description of method for manufacturing a porous membrane.

Figure 1:
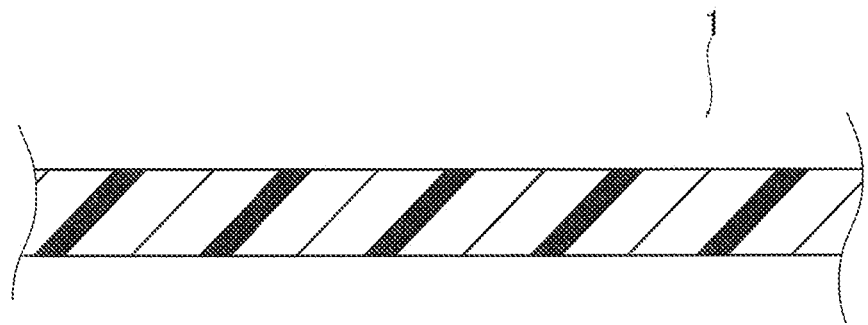
FIG. 1 is a schematic drawing illustrating the porous membrane which is manufactured by using the composition or the like of the first embodiment.
Figure 2:
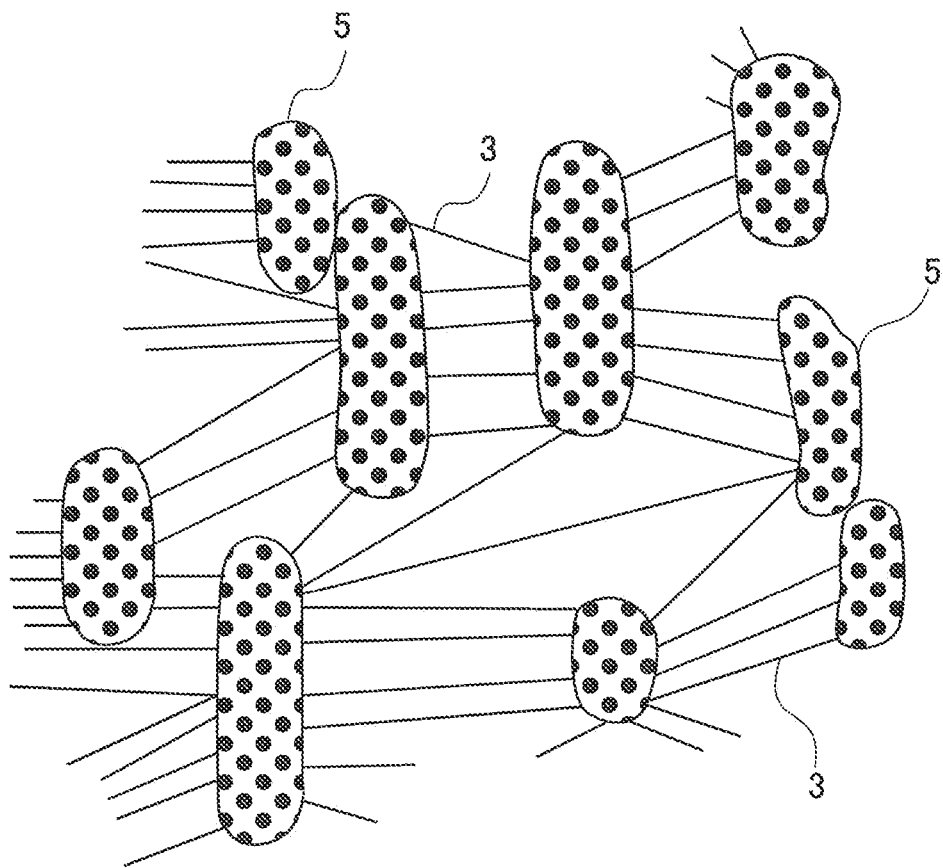
FIG. 2 is a drawing describing the structure of the porous membrane which is manufactured by using the composition or the like of the first embodiment.

FIG. 1 is a schematic drawing illustrating the porous membrane. FIG. 2 is a drawing describing the structure of the porous membrane. The porous membrane 1 is used for a filtering medium to capture dust in fluid, and it has the fibril 3 and the knotted portion 5 that is connected to each other via the fibril 3.

Fibril (a) Polytetrafluoroethylene that can be Fibrillated

The fibril 3 includes polytetrafluoroethylene that can be fibrillated. The polytetrafluoroethylene that can be fibrillated is high molecular weight PTFE which is obtained by emulsion polymerization or suspension polymerization of tetrafluoroethylene (TFE), for example. As described herein, the high molecular weight means that fibrillation can be easily achieved during manufacture of a porous membrane so that a fibril with long fiber length is obtained and, as having standard specific gravity (SSG) of 2.130 to 2.230, and substantially exhibiting no melt fluidization due to high melt viscosity. From the viewpoint of ease of fibrillation and obtaining a fibril with long fiber lengthfibrillation, SSG of PTFE that can be fibrillated is preferably 2.130 to 2.190, and more preferably 2.140 to 2.170. When the SSG is excessively high, the drawing property of the mixture of the non-hot melt processable component that is not fibrillated and the hot melt processable component that is not fibrillated described below may be deteriorated. When the SSG is excessively low, the rolling property is deteriorated so that the homogeneity of the porous membrane may be deteriorated and the pressure loss of the porous membrane may increase. Further, from the viewpoint of ease of fibrillation and obtaining a fibril with long fiber lengthfibrillation, PTFE obtained by emulsion polymerization is preferable. Meanwhile, the standard specific gravity (SSG) is measured on the basis of ASTM D 4895.

The presence or absence of fibrillating property, that is, the possibility of having fibrillation, can be determined based on the possibility of having paste extrusion, which is the representative method for molding high molecular weight PTFE powder made of TFE polymer, generally, paste extrusion is possible since high molecular weight PTFE has a fibrillating property. When an unsintered molded article obtained by paste extrusion substantially has no strength or elongation, that is, when it breaks by pulling as having elongation of 0%, it can be recognized to have no fibrillating property.

The high molecular weight PTFE can be modified polytetrafluoroethylene (hereinbelow, referred to as the modified PTFE), homo polytetrafluoroethylene (hereinbelow, referred to as the homo PTFE), or a mixture of the modified PTFE and the homo PTFE. The homo PTFE is not particularly limited, and any homo PTFE can be preferably used if it is described in JP 53-60979 A, JP 57-135 A, JP 61-16907 A, JP 62-104816 A, JP 62-190206 A, JP 63-137906 A, JP 2000-143727 A, JP 2002-201217 A. WO 2007/046345 A, WO 2007/119829 A, WO 2009/001894 A, WO 2010/113950 A, or WO 2013/027850 A or the like. Among them, the homo PTFE having high drawing characteristics disclosed in JP 57-135 A, JP 63-137906 A, JP 2000-143727 A, JP 2002-201217 A. WO 2007/046345 A, WO 2007/119829 A, or WO 2010/113950 A is preferable.

The modified PTFE includes TFE and a monomer other than TFE (hereinbelow, referred to as a modified monomer). The modified monomer is generally those modified homogeneously with a modified monomer, those modified at early stage of a polymerization reaction, or those modified at final stage of a polymerization reaction, but it is not particularly limited. As for the modified PTFE, any modified PTFE can be preferably used if it is described in JP 60-42446 A, JP 61-16907 A, JP 62-104816 A, JP 62-190206 A, JP 64-1711 A, JP 2-261810 A, JP 11-240917 A, JP 11-240918 A, WO 2003/033555 A, WO 2005/061567 A. WO 2007/005361 A, WO 2011/055824 A, or WO 2013/027850 A or the like, for example. Among them, the modified PTFE having high drawing characteristics disclosed in JP 61-16907 A, JP 62-104816 A, JP 64-1711 A, JP 11-240917 A, WO 2003/033555 A, WO 2005/061567 A. WO 2007/005361 A, or WO 2011/055824 A or the like, is preferable.

The modified PTFE contains a TFE unit based on TFE and a modified monomer unit based on the modified monomer. The modified PTFE is preferably contained at 0.001 to 0.500% by weight, and more preferably at 0.01 to 0.30% by weight of the entire monomer units. As described herein, the modified monomer unit is a part of the molecular structure of the modified PTFE and it is a part derived from the modified monomer. The entire monomer units are a part derived from every monomer in the molecular structure of the modified PTFE.

The modified monomer is not particularly limited, if it is copolymerizable with TFE. Examples thereof include perfluoro-olefin such as hexafluoropropylene (HFP); chlorofluoro-olefin such as chlorotrifluoroethylene (CTFE); hydrogen-containing fluoro-olefin such as trifluoroethylene or vinylidene fluoride (VDF); perfluorovinyl ether; perfluoroalkyl ethylene (PFAE) and ethylene or the like. Further, the modified monomer which is used may be either one type or plural types.

Perfluorovinyl ether is not particularly limited, and examples thereof include a nonsaturated perfluoro compound or the like represented by the following general formula (1)

$$CF_2=CF-ORf \qquad (1)$$

In the formula, Rf represents a perfluoro organic group.

As described herein, the perfluoro organic group is an organic group in which every hydrogen atom bound to the carbon atom is substituted with a fluorine atom. The perfluoro organic group may have ether oxygen.

Examples of perfluorovinyl ether include perfluoro(alkyl vinyl ether) (PAVE) of the general formula (1) in which Rf is a perfluoroalkyl group having 1 to 10 carbon atoms. Carbon atom number of the perfluoroalkyl group is preferably 1 to 5. Examples of the perfluoroalkyl group in PAVE include a perfluoromethyl group, a perfluoroethyl group, a perfluoropropyl group, a perfluorobutyl group, a perfluoropentyl group, and a perfluorohexyl group or the like, for example. Preferred examples of PAVE include perfluoropropyl vinyl ether (PPVE) and perfluoromethyl vinyl ether (PMVE).

Perfluoroalkyl ethylene (PFAE) is not particularly limited, and examples thereof include perfluorobutyl ethylene (PFBE) and perfluorohexyl ethylene (PFHE) or the like, for example.

As for the modified monomer of the modified PTFE, at least one selected from a group consisting HFP, CTFE, VDF, PAVE, PFAE, and ethylene is preferable.

In particular, from the viewpoint of cease of fibrillation and obtaining a fibril with long fiber lengthfibrillation, it is preferable that the homo PTFE is contained in an amount of more than 50% by weight of the PTFE that can be fibrillated.

The PTFE that can be fibrillated is, from the viewpoint of maintaining the fiber structure of the porous membrane 1, preferably contained in an amount of more than 50% by weight of the porous membrane 1.

Knotted Portions

The knotted portion 5 is a part that is connected to each other via the fibril 3, and it contains PTFE that can be fibrillated, the non-hot melt processable component that is not fibrillated, and the hot melt processable component with a melting point of lower than 320° C. that is not fibrillated. The resulting knotted portion 5 is formed to have relatively large size in the porous membrane 1, and accordingly the porous membrane 1 having higher thickness than that of a related art is formed. Further, as containing a hot melt processable component that is not fibrillated, the resulting knotted portion 5 is relatively hard and plays a role of a column which supports the porous membrane 1 in thickness direction. As such, a decrease in filter performance as compressive force or the like is applied to the porous membrane 1 during a post step like lamination of the air permeable support 13 can be suppressed. The PTFE that can be fibrillated, which is contained in the knotted portion 5, is the same as the PTFE that can be fibrillated, which is used in the fibril 3 described above.

(b) Non-Hot Melt Processable Component that is not Fibrillated

The non-hot melt processable component that is not fibrillated is mainly localized in the knotted portion 5 as non-fibrous particles and it functions to suppress the fibrillation of PTFE that can be fibrillated. Examples of the non-hot melt processable component that is not fibrillated include a component having a thermoplastic property such as low molecular weight PTFE, a thermosetting resin, and an inorganic filler. When the non-hot melt processable component that is not fibrillated is a component having a thermoplastic property, it is preferable to have melting temperature of 320° C. or higher and high melt viscosity. For example, because the low molecular weight PTFE has high melt viscosity, it can stay in the knotted portions even when it is processed at a temperature which is higher than the melting point. As described herein, the low molecular weight PTFE means PTFE with number average molecular weight of 600.000 or less, melting point of between 320 to 335° C., and melt viscosity at 380° C. of 100 to $7.0 \times 10^5$ Pa·s (see, JP 10-147617 A). As for the method for producing low molecular weight PTFE, a thermal decomposition method in which high molecular weight PTFE powder (molding powder) obtained from suspension polymerization of TFE or high molecular weight PTFE powder (fine powder) obtained from emulsion polymerization of TFE and a specific fluorinated compound are reacted according to contact at high temperature (see, JP 61-162503 A), a method of illuminating ionizing radiation to high molecular weight PTFE powder or a molded article (see. JP 48-78252 A), and a method of polymerizing directly TFE with a chain transfer agent (see, WO 2004/050727 A. WO 2009/020187 A, and WO 2010/114033 A) or the like are known. Like the PTFE that can be fibrillated, the low molecular weight PTFE can be also the homo PTFE or the modified PTFE including a modified monomer described above.

The low molecular weight PTFE has no fibrillating property. The presence or absence of the fibrillating property can be determined by the aforementioned method. With regard to the low molecular weight PTFE, the unsintered molded article obtained by paste extrusion has substantially no strength or elongation, for example, elongation of 0%, and it breaks when pulled.

The low molecular weight PTFE used in the present invention is not particularly limited. However, those having melt viscosity at 380° C. of 1000 Pa·s or more are preferable. Those having melt viscosity at 380° C. of 5000 Pa·s or more are more preferable. Those having melt viscosity at 380° C. of 10000 Pa·s or more are even more preferable. As described above, when the melt viscosity is high, the non-hot melt processable component that is not fibrillated can stay in the knotted portion 5 even when a hot melt processable component that is not fibrillated is melt during manufacture of a porous membrane so that the fibrillation can be suppressed.

Examples of the thermosetting resin include each resin of epoxy, silicone, polyester, polyurethane, polyimide, and phenol, or the like, for example. From the viewpoint of the workability of the co-coagulation, a resin dispersed in water in a non-cured state is preferably used as the thermosetting resin. All of those thermosetting resins can be obtained as a commercially available product.

As for the inorganic filler, talc, mica, calcium silicate, glass fiber, calcium carbonate, magnesium carbonate, carbon fiber, barium sulfate, calcium sulfate, or the like are used. Among them, from the viewpoint of affinity with PTFE and specific gravity, talc is preferably used. From the viewpoint for forming stably dispersion during manufacture of the porous membrane 1, those having particle diameter of 3 to 20 μm are preferably used. All of those inorganic fillers can be obtained as a commercially available product.

The non-hot melt processable component that is not fibrillated is preferably contained at 1 to 50% by weight of the porous membrane 1. When the content of the non-hot melt processable component that is not fibrillated is 50% by weight or less, the fiber structure of the porous membrane 1 can be maintained. The non-hot melt processable component that is not fibrillated is contained preferably at 20 to 40% by weight, and more preferably at 30% by weight. By containing it at 20 to 40% by weight, fibrillation of PTFE that can be fibrillated can be more effectively suppressed.

(c) Hot Melt Processable Component with Melting Point of Lower than 320° C. that is not Fibrillated The hot melt processable component with a melting point of lower than 320° C. that is not fibrillated (hereinbelow, also referred to as the hot melt processable component that is not fibrillated) has fluidity at melting so that it melts during the manufacture (drawing) of the porous membrane 1 and can be hardened in the knotted portion 5, thus increasing the strength of the entire porous membrane 1. Accordingly, deterioration in filter performance can be suppressed when it is compressed during a post step. The hot melt processable component that is not fibrillated preferably exhibits the melt viscosity of less than 10000 Pa·s at 380° C. Meanwhile, the melting point of the hot melt processable component that is not fibrillated is obtained from a peak top in a diagram of latent heat of fusion, which is obtained by, by using differential scanning calorimetry (DSC), once complete melting by increasing the temperature at temperature increase rate of 10° C./minute to melting temperature or higher, cooling at 10° C./minute to melting temperature or lower, and increasing the temperature again at 10° C./minute.

Examples of the hot melt processable component that is not fibrillated include a hot melt processable fluoro polymer, silicone, polystyrene, polyethylene terephthalate (PET), polyester, polyamide, or the like, or a mixture thereof, and those capable of fully exhibiting melting property and fluidity at the drawing temperature for manufacturing the porous membrane 1 can be included. Among them, from the viewpoint of having excellent heat resistance at the drawing temperature for manufacturing the porous membrane 1 and excellent chemical resistance, a hot melt processable fluoro polymer is preferable. Examples of the hot melt processable fluoro polymer include a fluoro polymer containing a copolymerization unit that is derived from at least one fluorinated ethylenically unsaturated monomer represented by the following general formula (2) or preferably two or more monomers $$RCF=CR_2 \qquad (2)$$

(in the formula, R each independently is selected from H, F, Cl, alkyl having 1 to 8 carbon atoms, aryl having 6 to 8 carbon atoms, cyclic alkyl having 3 to 10 carbon atoms, and perfluoroalkyl having 1 to 8 carbon atoms, and in such case, it is possible that all Rs are identical, any two Rs are identical and the remaining one R is different from them, or all Rs are different).

Useful examples of the compound represented by the general formula (2) include, although not limited thereto, perfluoroolefin such as fluoroethylene, VDF, trifluoroethylene, TFE, or HFP, chlorofluoroolefin such as CTFE or dichlorodifluoroethylene, (perfluoroalkyl)ethylene such as PFBE or PFHE, perfluoro-1,3-dioxol, and a mixture thereof.

It is also possible that the fluoropolymer contains a copolymer that is derived from copolymerization between at least one monomer represented by the above general formula (2) and at least one copolymerizable comonomer represented by the above general formula (1) and/or following general formula (3)

$$R_2C=CR_2 \qquad (3)$$

(in the formula, R each independently is selected from H, F, Cl, alkyl having 1 to 8 carbon atoms, aryl having 6 to 8 carbon atoms, cyclic alkyl having 3 to 10 carbon atoms, and perfluoroalkyl having 1 to 8 carbon atoms, and in such case, it is possible that all Rs are identical, any two or more Rs are identical and the remaining one or more Rs are different from them, or all Rs are different, in which the remaining Rs can be different from each other when there are plural of them).

Useful examples of the compound represented by the general formula (1) include PAVE and preferred examples include PPVE and PMVE or the like.

Useful examples of the compound represented by the general formula (3) include ethylene and propylene or the like.

More specific examples of the fluoro polymer include polyfluoroethylene derived from polymerization of fluoroethylene, polyvinyldiene fluoride (PVDF) derived from polymerization of VDF, polychlorotrifluoroethylene (PCTFE) derived from polymerization of CTFE, a fluoro polymer derived from copolymerization of two or more different monomers represented by the above general formula (2), and a fluoro polymer derived from copolymerization between at least one monomer of the above general formula (2) and at least one monomer represented by the above general formula (1) and/or at least one monomer represented by the above general formula (3).

Examples of the polymer include a polymer having a copolymer unit derived from VDF and HFP and a polymer derived from TFE and at least one copolymerizable comonomer (at least 3% by weight) other than TFE. Examples of the latter type of the fluoro polymer include TFE/PAVE copolymer (PFA), TFE/PAVE/CTFE copolymer, TFE/HFP copolymer (FEP), TFE/ethylene copolymer (ETFE), TFE/HFP/ethylene copolymer (EFEP), TFE/VDF copolymer, TFENDF/HFP copolymer, TFE/VDF/CTFE copolymer or the like, and a mixture thereof.

Content of the hot melt processable component that is not fibrillated in the porous membrane 1 is equal to or more than 0.1 by weight but less than 20% by weight. When it is equal to or more than 20% by weight, the hot melt processable component that is not fibrillated is dispersed in an area other than the knotted portion 5 of the porous membrane 1 so that the pressure loss becomes high when it is used for a filtering medium for an air filter described below, in particular. Further, because it is difficult to perform drawing at high ratio like elongation area ratio of 40 times or more described below, a problem is caused in manufacturing the porous membrane 1. On the other hand, when it is less than 0.1% by weight, a deterioration in filter performance of the porous membrane, which is caused by compressive force or the like during a post step, cannot be fully suppressed. Content of the hot melt processable component that is not fibrillated in the porous membrane 1 is preferably 15% by weight or less, and more preferably 10% by weight or less. Further, content of the hot melt processable component that is not fibrillated in the porous membrane 1 is, from the viewpoint of ensuring the strength of the porous membrane 1, preferably 0.5% by weight or more. It is particularly preferably 5% by weight or so.

When the porous membrane 1 is used for a filtering medium for an air filter, the content of the hot melt processable component that is not fibrillated is preferably 10% by weight or less to have good drawing with elongation area ratio of 40 to 800 times.

The porous membrane 1 preferably has the filling ratio of 1 to 20%, and more preferably 2 to 10%, in which the filling ratio is obtained by the following equation.

Filling ratio (%)={1−(Pore volume in porous membrane/Volume of porous membrane)}×100

The porous membrane 1 with above filling ratio has membrane thickness reduction rate of 1.5 µm/sec or less, which is described below when pressure of 6.4 kPa is applied.

The porous membrane 1 can be obtained by the method for manufacturing a porous membrane which is described below. Further, the porous membrane 1 can be manufactured by using the composition, mixed powder, and material for molding that are described below, for example.

The porous membrane 1 can be used for a filtering medium for an air filter or a liquid filter. The porous membrane 1 is preferably used for a filtering medium for an air filter, and the film thickness is 150 µm or less, and preferably 7 to 120 µm. Further, the average fiber diameter of the fiber constituting the porous membrane 1 is 50 nm to 200 nm, and preferably 80 nm to 200 nm.

Filtering Medium for an Air Filter

Next, the filtering medium 9 using the aforementioned porous membrane 1 is described.

Figure 3:
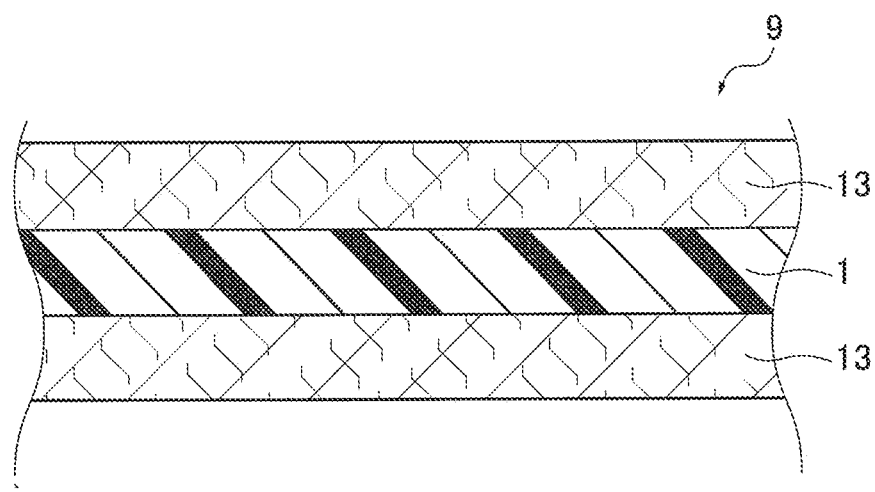
FIG. 3 is a drawing illustrating the filtering medium for a filter in which the porous membrane of FIG. 1 is used.

FIG. 3 is a drawing illustrating the filtering medium 9. The filtering medium 9 is to capture dust in gas, and it includes the aforementioned porous membrane 1 and the air permeable support 13 laminated on both sides of the porous membrane 1. Although the material and structure of the air permeable support 13 are not particularly limited, a non-woven fabric, a woven fabric, a metal mesh, a resin net, or the like are used, for example. Among them, a non-woven fabric having strength, collecting property, flexibility, and heat fusion property in terms of workability is preferable. Further, the non-woven fabric can be a non-woven fabric in which part or all constituting fibers have a core/sheath structure or a bilayer non-woven fabric including two layers having a material with low melting point and a material with high melting point. Material of the non-woven fabric is not particularly limited, and polyolefin (PE, PP, or the like), polyamide, polyester (PET or the like), aromatic polyamide, or a composite material of them can be used. With regard to the non-woven fabric with a core/sheath structure, the core component preferably has higher melting point than the sheath component. Examples of the combination of each material of the core/sheath include PET/PE and polyester with high melting point/polyester with low melting point. The air permeable support 13 can be adhered to the porous membrane 1 by partial melting of the air permeable support 13 by heating, by melting of a hot melt resin, by using an anchor effect, or by using the adhesion with reactive adhesives or the like.

Weight and thickness of the air permeable support 13 per unit area are not particularly limited, and they can be the same or different on two sides of the porous membrane 1. Further, the porous membrane can be a single layer or a multilayer in which plural pieces are overlaid. In that case, the plural porous membranes can be the same type, or the air permeable support 13 can be inserted between them. Meanwhile, the air permeable support 13 can be laminated on just one side of the porous membrane 1 in other embodiment.

The filtering medium 9, from the viewpoint of long life span, can have a pre-collecting layer (not illustrated) further laminated on the air permeable support 13 on a single side (in general, at upstream side of air flow which passes through the filtering medium). As for the pre-collecting layer, those obtained by a melt blown method are used, for example. Examples of the material of the pre-collecting layer include, in addition to polyethylene (PE), polypropylene (PP), polyethylene terephthalate (PET), polybutylene terephthalate (PBT), polyamide (PA), polyacrylonitrile (PAN), polyvinylidene fluoride (PVdF), polyvinyl alcohol (PVA), and polyurethane (PU) or the like. The pre-collecting layer can be adhered to the porous membrane 1 by thermal lamination using a hot melt resin, for example. The filtering medium 9 provided with the pre-collecting layer is preferably used as a HEPA filter. In that case, the air permeable support 13 with different thickness but the same weight per unit area at two sides of the porous membrane is used. Meanwhile, when the filtering medium is used as a ULPA filter, the aforementioned pre-collecting layer is unnecessary. Further, the filtering medium 9 can have a pre-collecting layer directly laminated on the porous membrane 1 instead of the air permeable support 13.

In the aforementioned filtering medium 9, the knotted portion 5 is hardened by a hot melt processable component that is not fibrillated as described above, and thus the strength of the porous membrane 1 is enhanced. For such reasons, even when compressive force or the like is applied at the time of laminating the air permeable support 13 on the porous membrane 1, a deterioration of filter performance like pressure loss, PF value, and filter life span as caused by squashing of the membrane structure of the porous membrane 1 is suppressed.

Further, as the porous membrane 1 used for the filtering medium 9 mainly includes PTFE that can be fibrillated, a porous membrane with low filling ratio and high air permeability can be obtained. By using this porous membrane 1, not only a filtering medium with a low pressure loss can be obtained but also the filter life span is significantly improved and the life span like glass fiber filter can be achieved as the strength of the porous membrane 1 is improved as described above. As described herein, the low filling ratio means the filling ratio of 1 to 20%, which is calculated by the aforementioned equation. The high air permeability means a low pressure loss. The low pressure loss indicates that the pressure loss measured by the following method is less than 200 Pa. The filter life span is measured by the method described below.

The Filtering Medium 9 is Used for the Following Use, for Example.

A field of ULPA filter (for manufacturing a semiconductor), a HEPA filter (for hospital use or manufacturing a semiconductor), a columnar cartridge filter (for industrial use), a bag filter (for industrial use), a heat resistant bag filter (for exhaust fumes treatment), a heat resistant pleats filter (for exhaust fumes treatment), SINBRAN (registered trademark) filter (for industrial use), a catalyst filter (for exhaust fumes treatment), a filter having adsorbent (for HDD's (Hard Disk Drive's) build-in), a bent filter having adsorbent (for HDD's build-in), a bent filter (for HDD's build-in), a filter for vacuum cleaner (for use in a vacuum cleaner), a universal multilayer felt medium, a cartridge filter for GT (Gire-Toumois) (for use in GT compatible product), and a cooling filter (for use in casing of electronic device), and the like;

A field of ventilation or inner pressure adjustment such as a material for freeze drying like a container for freeze drying, a ventilation material for an electronic circuit or a lamp of an automobile, a use for container such as cap of a container, a use for protection and a ventilation of an electronic device, and a use for ventilation in medical use.

A field of liquid filtration such as a filter for filtering semiconductor liquid (for manufacturing a semiconductor), a hydrophilic PTFE filter (for manufacturing a semiconductor), a filter for chemical reagent (for treating chemical liquid), a filter for pure water manufacturing line (for manufacturing pure water), and a filter for reverse washing type liquid filtration (for treating industrial waste water).

Air Filter Unit

Next, the air filter unit using the filtering medium described above is described.

Figure 4:
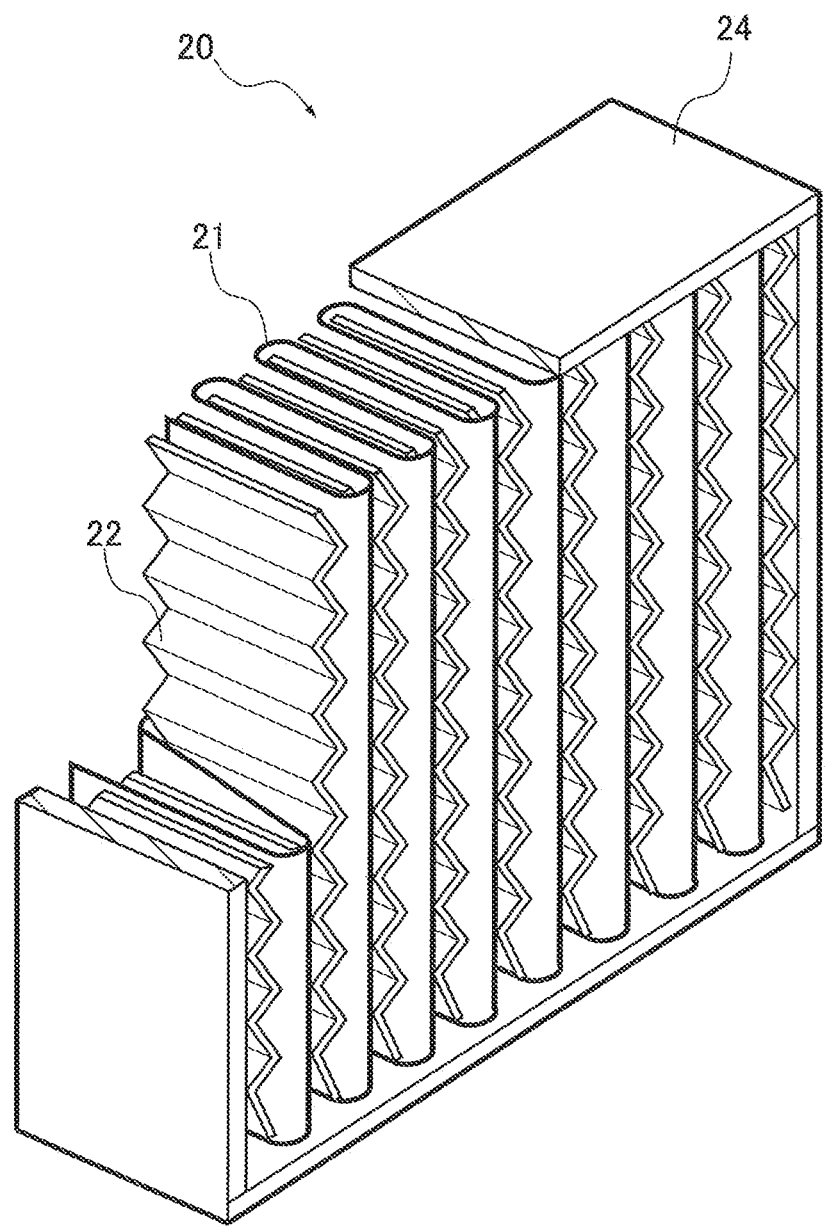
FIG. 4 is a drawing illustrating the air filter unit in which the filtering medium of FIG. 3 is used.

FIG. 4 is a perspective view illustrating the air filter unit 20. The air filter unit 20 includes the processed filtering medium 21, the separator 22, and the frame body 24. The processed filtering medium 21 is a filtering medium with a zigzag shape, which is obtained by pleats processing of the filtering medium 9 in sheet shape by performing outward folding and inward folding to have a peak part and a valley part. The separator 22 is to maintain the zigzag shape of the processed filtering medium 21, and due to corrugation processing of a thin plate, it has a wave shape and is inserted to the valley part. The frame body 24 is formed by combining panels, and the processed filtering medium 21 inserted with the separator 22 is installed inside while keeping the entire separator 22. Meanwhile, in FIG. 4, the processed filtering medium 21, the separator 22, and the frame body 24 are illustrated in partially cut-out state.

Because the strength of the porous membrane used for the processed filtering medium 21 is improved in the air filter unit as described above, even when compressive force or the like is applied during processing of a filtering medium into a zigzag shape, a deterioration of the filter performance such as pressure loss, PF value, or filter life span as caused by squashing of the membrane structure of the porous membrane is suppressed. Further, even though the pressure loss is lower than an air filter unit of a related art in which a filtering medium of glass fiber is used, the filter life span equivalent thereto is obtained.

Meanwhile, according to other embodiment, the air filter unit can be manufactured as an air filter unit of mini pleats type illustrated in FIG. 3 of JP 2012-020274 A, for example, by using the filtering medium described above.

Method for Manufacturing Porous Membrane

According to the first embodiment, the method for manufacturing a porous membrane includes:

a) a step of mixing an aqueous dispersion of a hot melt processable component with a melting point of lower than 320° C. that is not fibrillated (hereinbelow, also referred to as the component C) in addition to an aqueous dispersion of polytetrafluoroethylene that can be fibrillated (hereinbelow, also referred to as the component A) and an aqueous dispersion of a non-hot melt processable component that is not fibrillated (hereinbelow, also referred to as the component B) such that it is contained at being equal to or more than 0.1% by weight but less than 20% by weight of the total components which form the porous membrane followed by performing co-coagulation, b) a step of paste-extruding the material obtained from the step a), c) a step of rolling the extrudate obtained from the step b), and d) a step of drawing the rolled product obtained from the step c) at a temperature which is equal to or lower than the decomposition temperature of each component forming the porous membrane.

Meanwhile, according to other embodiment, the three components can be mixed by other method instead of performing the co-coagulation of aqueous dispersions of the three components in the step a). From the viewpoint of homogeneous mixing of the three components, mixing the three components by the co-coagulation as described above is preferable.

Herein, the composition, mixed powder, and material for molding of this embodiment are described.

The composition, mixed powder, material for molding all contain the component A, the component B, and the component C, and the component C is contained at being equal to or greater than 0.1% but less than 20% by weight. Each of the component A, the component B, and the component C is the same as the PTFE that can be fibrillated, the non-hot melt processable component that is not fibrillated, and the hot melt processable component that is not fibrillated that are described above, respectively.

The material for molding is, for example, a material for molding a porous membrane which is used for a filtering medium for a filter to capture fine particles in fluid.

The composition of the present invention can be the mixed powder described below, or it can be a mixture not in powder form. As for the mixed powder, the fine powder obtained by co-coagulation that is used in the following example, powder obtained by mixing two kinds of the three materials by co-coagulation and mixing the remaining one kind of the component by using a mixer, and powder obtained by mixing three materials by using a mixer can be mentioned. Examples of a mixture not in powder form include a molded article like a porous body and an aqueous dispersion containing the three kinds of the component. Meanwhile, the porous membrane described in the first embodiment is included in a porous body or the like.

The material for molding indicates those obtained after adjustment for processing to mold the composition and examples thereof include those added with a processing aid or the like, those with adjusted particle size, and those obtained after preliminary molding. The material for molding may include, in addition to the aforementioned three components, a well-known additive or the like. Examples of the well-known additive include a carbon material such as carbon nanotube or carbon black, a pigment, a photocatalyst, activated carbon, an anti-microbial agent, an adsorbent, and a deodorant.

The composition of the present invention can be manufactured by various methods. For example, when the composition is mixed powder, it can be manufactured by a method in which powder of the component A, powder of the component B, and powder of the component C are mixed by a common mixer or the like, a method in which co-coagulated powder is obtained by co-coagulating (that is, the step a) described above) three aqueous dispersions each containing the component A, the component B, and the component C, or a method of mixing mixed powder which is obtained by co-coagulating in advance an aqueous dispersion containing any two components of the component A, the component B, and the component C with powder of the remaining one component using a common mixer or the like, or the like. Among them, from the viewpoint of easily and homogeneously dispersing three different components, the composition of the present invention is preferably obtained by co-coagulating three aqueous dispersions each containing the component A, the component B, and the component C.

The size of the mixed powder obtained by co-coagulation is not particularly limited, but the average particle diameter is 100 to 1000 μm, for example. Preferably, it is 300 to 800 μm. In that case, the average particle diameter is measured on the basis of JIS K6891. The apparent density of the mixed powder that is obtained by co-coagulation is not particularly limited. However, it is preferably 0.40 to 0.60 g/ml, and more preferably 0.45 to 0.55 g/ml. The apparent density is measured on the basis of JIS K6892.

The molded article obtained by molding with use of the composition, mixed powder, and material for molding of the present invention is also used, in addition to desirable use in a field of various filters, a field of ventilation/adjustment of inner pressure, or liquid filtration filter in the following fields, for example.

An electrochemical field such as dielectric prepreg, a material for shielding EMI (Electro Magnetic Interference), and a heat transfer material, more specifically, a printed wire board, a shielding material for blocking electrons, a heat transfer material for electric insulation, a material for electric insulation, an electrolytic device such as saline, or a reinforce material of a conductive polymer membrane used for a battery, or the like;

A field of air filter sealing medium such as gasket, packing, pump diaphragm, pump tube, and sealing material for an airplane;

A field of common consumer goods such as clothing (clothing for everyday life), cable guide (operation wire for a bike), clothing for a bike (clothing for everyday life), a cast liner (medical supporter), filter for vacuum cleaner, bag pipe (musical instrument), cable (signal cable or the like for guitar), or string (for string instrument);

A field of fibers such as PTFE fiber (fiber material), thread for sewing machine (textile), weaving yarn (textile), or rope: and A medical field such as implant in a living body (stretched product), artificial vein, catheter, general operation (material for reinforcing tissues), product for head and neck (substitute for dura mater), oral health (tissue-regenerating medicine), and orthopedic application (bandage).

Describing again the method for manufacturing a porous membrane, examples of the co-coagulation include the followings:

(i) a method in which an aqueous dispersion of the component A, an aqueous dispersion of the component B, and an aqueous dispersion of the component C are coagulated after mixing, (ii) a method in which an aqueous dispersion of any one of the component A, component B, and component C is added with powder of the remaining two components followed by coagulation, (iii) a method in which powder of any one of the component A, component B. and component C is added to a mixed aqueous dispersion in which aqueous dispersions of the remaining two components are mixed followed by coagulation, and (iv) a method in which mixed powder of any two components, which is obtained by mixing each aqueous dispersion of any two components of the component A, component B, and component C followed by coagulation, is added to an aqueous dispersion of the remaining one component followed by coagulation.

With regard to the method for co-coagulation, from the viewpoint of easy and homogeneous dispersion of the three components, the method of (i) above is preferable.

For the co-coagulation of the methods (i) to (iv) described above, the coagulation is preferably performed by adding any one of an acid such as nitric acid, hydrochloric acid, or sulfuric acid; a metal salt such as magnesium chloride, calcium chloride, sodium chloride, aluminum sulfate, magnesium sulfate, barium sulfate, sodium hydrogen carbonate, or sodium carbonate, and an organic solvent such as acetone or methanol.

The shape of the component A before mixing is not particularly limited, and it can be an aqueous dispersion or powder of the PTFE that can be fibrillated as described above. Examples of the powder of the PTFE that can be fibrillated (in particular, fine powder described above) include "TEFLON 6-J" (hereinbelow, "TEFLON" is a registered trademark), "TEFLON 6C-J", "TEFLON 62-J" or the like that are manufactured by Du Pont-Mitsui Fluorochemicals Co., Ltd., "POLYFLON F106", "POLYFLON F104", "POLYFLON F201", "POLYFLON F302" or the like that are manufactured by Daikin Industries, Ltd., "FLUON CD123", "FLUON CDI", "FLUON CD141", "FLUON CD145" or the like that are manufactured by Asahi Glass Co., Ltd., and "TEFLON 60". "TEFLON 60 X", "TEFLON 601A", "TEFLON 601 X", "TEFLON 613A", "TEFLON 613A X", "TEFLON 605XT X", "TEFLON 669 X" or the like manufactured by Du Pont.

The fine powder can be obtained by coagulation and drying of an aqueous dispersion of the PTFE that can be fibrillated, which is obtained by emulsion polymerization of TFE (that is, aqueous dispersion after finishing polymerization). Examples of the aqueous dispersion of the PTFE that can be fibrillated include an aqueous dispersion after finishing the polymerization described above or an aqueous dispersion that is commercially available. As for the preferred method for producing an aqueous dispersion of the FPTFE that can be fibrillated, which is obtained after finishing the polymerization, include a production method described in the publications or the like that are listed above in relation to disclosure of the homo PTFE. Examples of the commercially available aqueous dispersion of the PTFE that can be fibrillated include aqueous dispersions such as "POLYFLON D-110", "POLYFLON D-210", "POLYFLON D-210C", "POLYFLON D-310" or the like that are manufactured by Daikin Industries, Ltd., "TEFLON 31-JR", "TEFLON 34-JR" or the like that are manufactured by Du Pont-Mitsui Fluorochemicals Co., Ltd., or "FLUON AD911L", "FLUON AD912L", "AD938L" or the like that are manufactured by Asahi Glass Co., Ltd. Because all of the commercially available aqueous dispersion of the PTFE that can be fibrillated is added with 2 to 10 parts by weight of a non-ionic surfactant relative or the like to 100 parts by weight of PTFE in the aqueous dispersion to maintain the stability, the non-ionic surfactant may easily remain in the mixed powder which is obtained by co-coagulation, and thus it is likely to have a potential problem like coloration of a porous body. For such reasons, an aqueous dispersion obtained after finishing the polymerization is preferred as an aqueous dispersion of the PTFE that can be fibrillated.

The shape of the component B before mixing is not particularly limited, but when the component B is low molecular weight PTFE, it is not particularly limited, but can be an aqueous dispersion or powder (generally referred to as PTFE micropowder or micropowder). Examples of the powder of the low molecular weight PTFE include "MP1300-J" or the like that are manufactured by Du Pont-Mitsui Fluorochemicals Co., Ltd., "LUBRON L-5", "LUBRON L-5F" or the like that are manufactured by Daikin Industries, Ltd., "FLUON L169J", "FLUON L170J", "FLUON L172J" or the like that are manufactured by Asahi Glass Co., Ltd., and "KTL-F", "KTL-500F" or the like manufactured by Kitamura Limited.

The aqueous dispersion of the low molecular weight PTFE can be an aqueous dispersion after finishing the polymerization of the TFE as obtained by emulsion polymerization or an aqueous dispersion that is commercially available. Further, those obtained by dispersing micro powder in water by using a surfactant or the like can be also used. As for the preferred method for producing an aqueous dispersion of the PTFE that can be fibrillated, after finishing the polymerization, include a production method described in JP 7-165828 A. JP 10-147617 A, JP 2006-063140 A, JP 2009-1745 A, WO 2009/020187 A or the like. Examples of the commercially available aqueous dispersion of the PTFE that can be fibrillated include aqueous dispersions such as "LUBRON LDW-410" or the like that are manufactured by Daikin Industries, Ltd. Because the commercially available aqueous dispersion of the low molecular weight PTFE is added with 2 to 10 parts by weight of a non-ionic surfactant relative to 100 parts by weight of PTFE in the aqueous dispersion to maintain the stability, the non-ionic surfactant or the like may easily remain in the mixed powder which is obtained by co-coagulation, and thus it is likely to have a potential problem like coloration of a porous body. For such reasons, an aqueous dispersion obtained after finishing the polymerization is preferred as an aqueous dispersion of the low molecular weight PTFE.

Further, even when an inorganic filler is used as the component B, it is preferably an aqueous dispersion, although the shape before mixing is not particularly limited. Examples of the inorganic filler include "TALC P2" manufactured by Nippon Talc Co., Ltd. and "LMR-100" manufactured by Fuji Talc Industrial Co., Ltd., or the like. They are used by dispersing powder in water after suitably performing a surface treatment using a silane coupling agent or the like, or the like. Among them, from the viewpoint of dispersibility in water, the secondary crushed product obtained by a jet mill (for example, "TALC P2") is preferably used.

Examples of the component C include, in addition to a fluororesin such as FEP or PFA, various resins like a non-cured silicone resin, acryl, urethane, and PET. The shape before mixing is not particularly limited, but it is preferably an aqueous dispersion. As for the aqueous dispersion, in case of a resin obtained by emulsion polymerization, resin powder dispersed in water by using a surfactant or the like can be also used in addition to a dispersion which is directly usable after finishing polymerization. The component C is prepared as an aqueous dispersion by dispersing a pre-determined amount in water such that it is contained at 0.1% or more but less than 20% by weight in a porous membrane.

The method for co-coagulation is not particularly limited. However, it is preferable to apply mechanical stirring force after mixing three aqueous dispersions.

After the co-coagulation, an extrusion aid (that is, liquid lubricant) is mixed after performing dehydration and drying, followed by extrusion. The liquid lubricant is not particularly limited if it is capable of wetting the surface of PTFE powder and can be removed after molding the mixture obtained by co-coagulation into a film shape. Examples thereof include alcohols of hydrocarbon oil such as fluid paraffin, naphtha, white oil, toluene, or xylene, ketones, and esters or the like.

The use amount of the liquid lubricant varies depending on the type of the liquid lubricant, or the like. However, it is generally 5 to 50 parts by weight relative to 100 parts by weight of the PTFE powder. By having a high use amount of the liquid lubricant, the pressure loss can be kept at low level.

The mixture obtained by co-coagulation is, after mixing with a liquid lubricant, extruded and rolled by a conventionally known method to be molded into a film-shaped product. The extrusion can be performed by paste extrusion, ram extrusion, or the like. Preferably, it is performed by paste extrusion. The rod shape extrudate extruded by paste extrusion is rolled under heating by using a calendar roll or the like under temperature condition of 40° C. to 80° C., for example. The thickness of the obtained rolled product in film shape is set based on the desired thickness of the porous membrane, and it is generally between 100 and 400 μm.

Next, the liquid lubricant is removed from the unsintered film as a rolled product. The removal of the liquid lubricant is performed by heating or extraction or a combination of them. The heating temperature for the heating method is not particularly limited if it is lower than the melting point of the hot melt processable component that is not fibrillated. It is 100 to 250° C., for example.

The rolled product from which the liquid lubricant is removed is drawn at the temperature which is equal to or higher than the melting temperature of the hot melt processable component that is not fibrillated but is equal to or lower than the decomposition temperature of the non-hot melt processable component that is not fibrillated. During this process, the hot melt processable component that is not fibrillated is melt and later hardened in the knotted portion 5, and thus the strength of the porous membrane 1 is increased in the thickness direction. The temperature for drawing can be set depending on the temperature of a furnace in which the drawing is performed or the temperature of a heating roller for conveying the rolled product. Alternatively, it may be realized by combining those settings.

The drawing includes drawing in the first direction and drawing in the second direction which is perpendicular to the first direction. When the porous membrane 1 is used for a filtering medium for an air filter, it is preferable to perform also the drawing in the second direction. In this embodiment, the first direction indicates the length direction of a rolled product (that is, longitudinal direction) and the second direction indicates the width direction of a rolled product (that is, horizontal direction).

The rolled product is drawn at elongation area ratio of 40 to 800 times. The drawing speed in the first direction is preferably 10 to 600%/second, and more preferably 10 to 150%/second. The temperature at the time of drawing is preferably 200 to 350° C., and more preferably 280 to 310° C.

The drawing speed in the second direction is preferably 10 to 600%/second. The temperature at the time of drawing is preferably 200 to 400° C., and more preferably 250 to 350° C. The drawing in the second direction can be performed either simultaneously or separately with the drawing in the first direction.

With regard to the drawing of a rolled product (also referred to as unsintered PTFE product), the temperature, drawing ratio, and drawing speed at the time of drawing are known to have an effect on the physical properties of a drawn product. The S-S curve of the unsintered PTFE product (that is, graph illustrating the relationship between tensile strength and elongation) exhibits specific characteristics that are different from those of other resins. In general, the resin material illustrates increased tensile strength in accordance with elongation. The range of elastic range, break point, and the like vary depending on materials and conditions for evaluation. However, it is very common that the tensile strength exhibits increasing tendency in accordance with the elongation amount. On the other hand, the tensile strength of the unsintered PTFE product exhibits a gradual decrease tendency after illustrating a peak at a certain elongation amount. It represents the presence of a "region in which an undrawn part becomes weaker than a drawn part" in an unsintered PTFE product.

When it is translated in terms of the behavior during drawing, the weakest part in a drawing plane starts to elongate during drawing, and as the drawn part becomes stronger than the undrawn part, the next weakest undrawn part is drawn and so on. As a result, the drawn region is broadened to yield overall drawing. Meanwhile, in case of the unsintered PTFE product, when the part about to elongate reaches the "region in which an undrawn part becomes weaker than a drawn part", the part which is already elongated is further drawn, and as a result, the undrawn part remains as a node (that is, knotted portion, undrawn part). As the drawing speed becomes slow, this phenomenon becomes more significant, leaving a larger node (that is, knotted portion, undrawn part). By using this phenomenon during drawing, controlling the physical properties of a drawn product is performed depending on various uses.

According to this embodiment, it is more preferable to obtain a drawn product with lower density, and it is effective for applying the low drawing speed to the first drawing, in particular. When it is desired to obtain a molded product with low filling ratio while keeping a large node (that is, knotted portion, undrawn part) for obtaining a molded article having physical properties that are suitable for the purpose of the present invention, it is necessary that the drawing speed of the first drawing is 150%/second or less, and preferably 80%/second or less and the drawing in the second direction is 500%/second or less when conventional PTFE is used only as a raw material. However, the structure of the molded article with low filling ratio, which is obtained as above, is easily damaged by external force.

In this embodiment, due to the presence of the non-hot melt processable component that is not fibrillated, the above phenomenon caused by low drawing speed becomes more significant. As a result, as a range of applicable drawing speed, the drawing speed of the first drawing could increase to 600%/second or less, and preferably 150%/second or less, and the drawing speed in the second direction could increase to 600%/second or less. Further, due to the presence of the hot melt processable component that is not fibrillated, it becomes possible to maintain the structure even after the post processing.

It is preferable that the porous membrane 1 obtained accordingly is thermally fixed to obtain increased strength or dimensional stability. The temperature for thermal fixing can be equal to or higher, or lower than the melting temperature of PTFE, and it is preferably 250 to 400° C.

Second Embodiment

Hereinbelow, the method for manufacturing a filtering medium for an air filter, air filter unit, and porous membrane according to the second embodiment is described.

Figure 5:
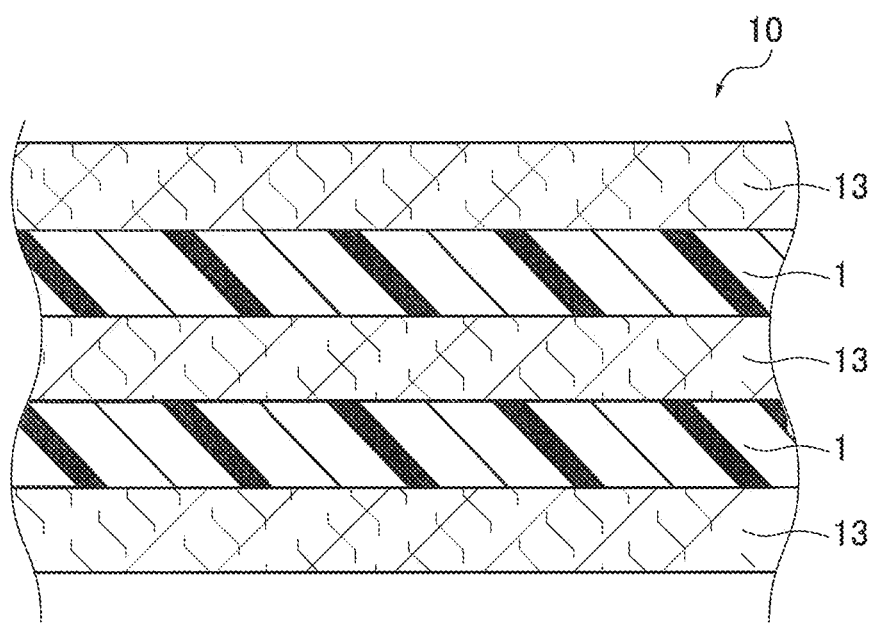
FIG. 5 is a drawing illustrating the cross section of the filtering medium for an air filter having five layer structure of the second embodiment.

FIG. 3 is a drawing illustrating the cross section of the filtering medium 9 for an air filter of this embodiment in thickness-direction. FIG. 5 is a drawing illustrating the cross section of the filtering medium 10 for an air filter of this embodiment in thickness-direction. FIG. 5 illustrates the filtering medium with a five layer structure.

The filtering medium 10 for an air filter is a filtering medium for an air filter which includes one or more porous membrane 1 having PTFE as a main component and a plurality of air permeable supports 13 which supports the porous membrane 1 and is arranged at least on the outermost layer, in which the pressure loss when air is passed through at a flow rate of 5.3 cm/sec is less than 200 Pa, the PF value represented by the following equation is 17 or higher when air containing NaCl particles with particle diameter of 0.3 μm is passed through at a flow rate of 5.3 cm/sec, the dust holding capacity of polyalphaolefins particles is 20 g/m² or more when air containing polyalphaolefin particles with a count median diameter of 0.25 μm is continuously passed through at a flow rate of 5.3 cm/sec and pressure loss is increased to 250 Pa, and the membrane thickness of one piece of the porous membrane described above is 30 am or more.

$$PF=-\log\left[(\text{Transmittance }(\%))/100\right]/\text{Pressure loss (Pa)}\times 1000,$$

wherein Transmittance=100−Collection efficiency (%).

The pressure loss described herein indicates the initial pressure loss. The "initial" means a time point at which the filtering medium for an air filter is hold on a frame body to give an air filter unit and it become a usable state after installing it at a pre-determined location.

The filtering medium 9 or 10 for an air filter includes one or more porous membrane 1 and a plurality of air permeable supports 13 as described above. The filtering medium 9 illustrated in FIG. 3 has a three layer structure with one piece of the porous membrane 1 and two pieces of the air permeable support 13 having the porous membrane 1 between them. The filtering medium 10 illustrated in FIG. 5 has a five layer structure in which two pieces of the porous membrane 1 and three pieces of the air permeable support 13 are laminated alternately. Porous membrane FIG. 2 is a drawing describing the structure of the porous membrane 1 of the filtering medium 9 or 10. The porous membrane 1 includes the polytetrafluoroethylene that can be fibrillated, the non-hot melt processable component that is not fibrillated, and the hot melt processable component with a melting point of lower than 320° C. that is not fibrillated.

Each of those components is the same as the polytetrafluoroethylene that can be fibrillated, the non-hot melt processable component that is not fibrillated, and the hot melt processable component with a melting point of lower than 320° C. that is not fibrillated, which have been described in the first embodiment.

When the porous membrane 1 is used as a filtering medium for an air filter, to have favorable drawing at elongation area ratio of 40 times or more but less than 150 times, the content of the hot melt processable component that is not fibrillated is preferably 10% by weight or less.

The filling ratio of porous membrane 1, which is calculated according to the following equation, is preferably 1 to 20%, and more preferably 2 to 10%.

Filling ratio (%)=(Specific gravity of porous membrane)/(Specific gravity of raw material)×100

Specific gravity of porous membrane=(Weight of porous membrane)/(Membrane thickness of porous membrane×Area of porous membrane)

Meanwhile, the specific gravity of the raw material is represented by a value obtained by dividing the sum of the product of specific gravity of each component with weight ratio of each component by the sum of the weight ratio, in case of a mixed raw materials which include plural components.

Membrane thickness of the porous membrane 1 is 30 μm or more. As described herein, the membrane thickness means the membrane thickness of a single piece of the porous membrane 1. When the filtering medium has one or more porous membrane 1, it indicates the membrane thickness of each layer. The membrane thickness of the porous membrane 1 is preferably 35 μm or more, and more preferably 40 μm or more. From the viewpoint of having the pressure loss of less than 200 Pa for the filtering medium, the membrane thickness is preferably 250 μm or less and more preferably 200 μm or less. The membrane thickness is measured by using a membrane thickness meter. With the membrane thickness being equal to or less than the upper limit of the above range, an increase in the pressure loss of the filtering medium is suppressed. By containing a predetermined amount of the melt processable component that is not fibrillated in the porous membrane 1 and hardening of the component in the knotted portion 5, the knotted portion 5 becomes hard and thus it is not squashed even when compressive force or the like is applied in a membrane thickness direction during a post step. Accordingly, the membrane thickness can be maintained. As the occurrence of a fiber with thin fiber diameter is suppressed as described above, the porous membrane 1 has a structure with many voids in which overlapping of fibers is reduced. With this structure, although the pressure loss is maintained at low level, the collection efficiency compared at the same membrane thickness is lowered compared to a porous PTFE membrane of a related art in which the non-hot melt processable component that is not fibrillated is not contained. However, by containing the hot melt processable component that is not fibrillated, the strength in the thickness direction of the porous membrane 1 is increased so that the volume can be increased to the aforementioned membrane thickness range compared to a porous PTFE membrane of a related art in which the hot melt processable component that is not fibrillated is not contained. Accordingly, the fiber amount increases in the thickness direction of the porous membrane 1, and thus not only a negative influence of the collection efficiency is suppressed but also the dust holding capacity can be significantly increased due to the membrane structure having many voids while inhibiting an increase in the pressure loss.

Further, when the porous PTFE membrane is drawn at high ratio to lower the pressure loss, the density difference in a thin fiber which is generated between different regions in the same filtering medium is increased, yielding a high deviation in the pressure difference. The deviation in the pressure difference described herein means a deviation in pressure difference between different regions in the same filtering medium.

Because wind flow is concentrated in a region with low pressure loss to yield lower collection efficiency, when there is high deviation in pressure loss, a problem of having a region with low collection efficiency which is present partially in a filtering medium becomes significant.

According to the present invention, compared to a porous PTFE membrane of a related art in which the non-hot melt processable component that is not fibrillated is not contained, the volume can be increased by maintaining the pressure loss at low level by drawing at low ratio and the deviation in pressure loss can be maintained at low level while significantly increasing the dust holding capacity. Further, by containing the hot melt processable component that is not fibrillated, the structure with high volume can be maintained even when external force is applied thereto.

As for the reason of having increased dust holding capacity based on the structure of the porous membrane 1, the followings can be considered. A porous PTFE membrane of a related art contains lots of tiny fibrils with thin fiber diameter so that the surface area per fibril is high and the collection efficiency per fiber is high. However, as the membrane thickness is thin, there are many overlapping of the fibers, and thus it is impossible to hold many fine particles. As a result, the extent of the collection efficiency per fiber is not effectively exhibited. On the other hand, as the membrane thickness is increased in the porous membrane 1 of this embodiment, the amount of fiber with thin fiber diameter is reduced but the amount of the relatively thick fiber and the amount of the void that are formed by those thick fibers in the porous membrane 1 are increased, and thus a fiber structure capable of increasing the dust holding capacity while suppressing an increase in the pressure loss or a decrease in the collection efficiency is obtained.

Because a region having thin fiber diameter and a large amount of fiber and a region having thick fiber diameter and a small amount of fiber are mixedly present in a filtering medium with a structure in which the deviation in fiber diameter is high, a region with improved dust holding capacity is partially present. When such filtering medium is adjoined to a unit, for example, it is expected that the average dust holding amount on a large area of the filtering medium is expected to be insufficiently improved, because the influence of a region having low dust holding capacity as having many thin fibers is high. Further, in case of a filtering medium with a structure in which the deviation in fiber diameter is high, the pressure loss is reduced in a region with thin fiber diameter and a small amount of fiber while the wind flow is concentrated in a region with low pressure loss, yielding lower collection efficiency. Accordingly, there are problems that the deviation in pressure loss increases and a region with low collection efficiency occurs in part of the filtering medium.

In order to reduce the deviation in pressure loss, it is preferable to perform sheet shape extrusion by using a T die with an appropriate shape at the time of extrusion.

When the extruded shape is a round rod shape, for example, the shape is greatly changed from a round rod shape to a sheet shape when it is processed into a sheet shape during rolling. At that time, the extrudate is more significantly squashed in an area closer to the center part of a cross section of the round rod shape. The part showing behavior that is different from other parts (that is, rolling behavior) is included in the sheet shape product. Meanwhile, when the extruded shape has a sheet shape, the shape change is small during the extrusion and the whole extrudate is squashed during rolling.

As described before, one or more layers of the porous membrane 1 can be contained in the filtering medium 9 to 11 for an air filter. Further, when a plurality of layers of the porous membrane 1 is contained, the porous membrane 1 can be directly laminated to each other or laminated as intermediated by the air permeable support 13. In that case, the air permeable support 13 can be a single layer or plural layers in which plural pieces are overlaid. Further, when plural layer of the porous membrane 1 are contained and the air permeable support 13 is interposed between the neighboring two porous membrane 1, the air permeable support 13 can be the same kind or different kind compared to the air permeable support 13 that is disposed on the outermost layer of the filtering medium 10 for an air filter.

Air Permeable Support

The air permeable support 13 is the same as the air permeable support described in the first embodiment.

One more layer of the air permeable support 13 may be contained in the filtering medium 10 for an air filter in addition to the outermost layer. The air permeable support 13 contained in the filtering medium 10 for an air filter can be the same kind or different kind.

The air permeable support 13 can be adhered to the porous membrane 1 by using the anchor effect based on partial melt of the air permeable support 13 by heating or melt of the hot melt resin or by using the adhesion using reactive adhesives or the like.

The layer structure of the filtering medium can be determined so as to achieve the collecting performance of the HEPA filter based on JIS Z8122, that is, an air filter having particle collecting ratio of 99.97% or more for the particles with particle diameter of 0.3 µm under standard wind amount and initial pressure loss of 245 Pa or lower. The layer structure of the filtering medium can be a three layer structure like the filtering medium 9 illustrated in FIG. 3, a five layer structure like the filtering medium 10 illustrated in FIG. 5, a four layer structure like the filtering medium 11 illustrated in FIG. 6, or a six or higher layer structure. Meanwhile, FIG. 6 is a drawing illustrating the cross section of the filtering medium in thickness direction, in which the filtering medium is according to a variation example of this embodiment.

In the filtering medium 10 with five layer structure illustrated in FIG. 5, each of the porous membrane 1 has average fiber diameter of 0.10 to 0.12 µm, membrane thickness of 35 to 60 µm, and filling ratio of 3 to 5%, and the filtering medium 10 has membrane thickness of 400 to 500 µm, for example.

Figure 6:
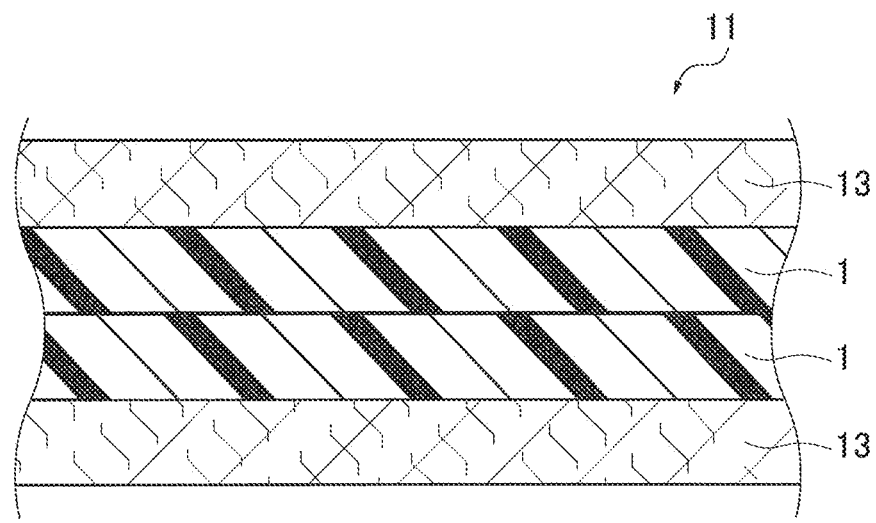
FIG. 6 is a drawing illustrating the cross section of the filtering medium for an air filter according to a variation example of the second embodiment.

The filtering medium 11 with four layer structure illustrated in FIG. 6 is obtained by disposing two pieces of the air permeable support 13 on the outside of two pieces of the porous membrane 1 that are directly laminated on each other. FIG. 6 is a drawing illustrating the cross section of the filtering medium in thickness direction, in which the filtering medium is according to a variation example of this embodiment. In the filtering medium 11 illustrated in FIG. 6, each of the porous membrane 1 has average fiber diameter of 0.10 to 0.12 µm, membrane thickness of 35 to 60 µm, filling ratio of 3 to 5%, and average pore diameter of 0.8 to 1.6 µm. The filtering medium 11 has membrane thickness of 400 to 500 µm, for example.

Meanwhile, the filtering medium having the collecting performance as a HEPA filter is not limited to those having a layer structure illustrated in FIG. 1, FIG. 3, or FIG. 6. The upper limit of the layer number in layer structure is determined within a region in which the pressure loss as a HEPA filter is not deteriorated. Further, it is sufficient for the filtering medium of the present invention to have the collecting performance as a HEPA filter, and it can be also an air filter which has the collecting performance of the ULPA filter based on JIS Z8122, that is, an air filter having particle collecting ratio of 99.9995% or more for the particles with particle diameter of 0.15 µm under standard wind amount and initial pressure loss of 245 Pa or lower.

The filtering medium of this embodiment has a pressure loss of less than 200 Pa as described above. As the structure of the porous membrane 1 is a structure in which an occurrence of fiber with thin fiber diameter is suppressed and voids are present in a large amount as described above, the pressure loss of the porous membrane 1 is maintained at low level, and as a result, the pressure loss as a filtering medium is maintained at the level of less than 200 Pa.

As described above, the PF value of the filtering medium of this embodiment is 17 or higher. When the structure of the porous membrane 1 is a structure with many voids and high volume having high membrane thickness, a decrease in collection efficiency of the porous membrane 1 is suppressed, and as a result, the collection efficiency as a filtering medium is high and the pressure loss is low. Accordingly, the PF value of 17 or higher is achieved.

As described above, the dust holding capacity of the filtering medium of this embodiment is 20 g/m$^2$ or higher. Because the dust holding capacity of the porous membrane 1 can be increased as described above, the dust holding capacity of 20 g/m$^2$ or higher is obtained for the filtering medium. The dust holding capacity is evaluated by pressure loss build-up test at the time of passage of PAO particles. The PAO particles are preferably used as a test particle from the viewpoint of being widely used compared to solid particles like NaCl.

The filtering medium of this embodiment preferably has collection efficiency of 99.97% or more when air including test particles, which are defined by the method for testing the performance of a filtering medium for an air filter used for a clean room as described in the attachment of JIS B9927, is continuously passed at a flow rate of 5.3 cm/second. As described above, because the structure of the porous membrane 1 is a structure with many voids and high volume having high membrane thickness, a decrease in collection efficiency of the porous membrane 1 is suppressed, and as a result, the collection efficiency as a filtering medium is maintained at 99.97% or higher.

The filtering medium of this embodiment preferably has variation coefficient CV of 5% or less, in which the variation coefficient CV is obtained by dividing the standard deviation of pressure loss distribution by an average value. The lower limit of the variation coefficient CV is 1%, for example. The pressure loss distribution of a filtering medium is obtained by dividing the filtering medium into 100 lattices and measuring the pressure loss in an area with diameter of 100 mm within each lattice. The measurement of pressure loss can be performed by using a measurement device equipped with a manometer for performing the measurement of the two surfaces of the filtering medium 10 while it is brought close to the surface of the filtering medium and operating the manometer such that it can move along the pre-determined path on the surface at downstream side of each region. Then, the standard deviation is calculated from pressure loss distribution which includes pressure loss measured from each region and, by dividing it with an average value of the pressure loss from every measured region, the variation coefficient CV (%) can be obtained. Meanwhile, unless specifically described otherwise, the filtering medium for an air filter of the present invention has an area from which plural pieces can be cut out to be used for plural air filter units. It is generally a long piece which is longer in length direction. The size of the filtering medium is not particularly limited. However, the length in the length direction is 100 to 1000 m and the length in the width direction is 600 to 2000 mm.

The variation coefficient CV of pressure loss of the filtering medium according to this embodiment is 5% or less compared to the variation coefficient of 10% or so of a porous PTFE membrane of a relate art, which includes homo PTFE. It also has suppressed deviation in pressure loss. The following reasons are considered. The porous PTFE membrane of a related art has low film thickness due to high drawing ratio, a region with low pressure loss due to heterogeneous drawing occurs, and due to the presence of a region with low pressure loss, the collection efficiency is lowered. As a method for improvement, lowering the drawing ratio at the time of manufacturing the porous membrane can be considered. However, simply lowering the drawing ratio may cause other problem like increased pressure loss. Under such circumstances, it is found that a porous membrane having high film thickness due to high average fiber diameter and fiber structure with many voids can be obtained by using a raw material for a porous membrane which contains the non-hot melt processable component that is not fibrillated and the hot melt processable component that is not fibrillated in addition to PTFE that can be fibrillated. By having such porous membrane, the filtering medium of this embodiment has pressure loss which is suppressed to a low value of less than 200 Pa, and together with low deviation in pressure loss, it has increased dust holding capacity.

As described above, even between regions of the same filtering medium, a region with high dust holding capacity and a region with low dust holding capacity may be present due to the deviation in fiber structure as described above. In such case, the dust holding capacity of the filtering medium as a whole is not an average of the region with high dust holding capacity and the region with low dust holding capacity, but it is believed to be lower as dominated by the region with low dust holding capacity. Thus, although there may be a local region with high dust holding capacity, there is a possibility that the dust holding capacity of the filtering medium as a whole is lowered so that having a high deviation among the regions of the filtering medium is not desirable. From this point of view also, the variation coefficient CV of the pressure loss is preferably 5% or less.

The filtering medium of this embodiment is a filtering medium for an air filter having a collecting performance as a HEPA filter, which includes the porous membrane 1 having PTFE as a main component and the air permeable support 13. The filtering medium has dust holding capacity of 20 g/m² or more and the membrane thickness of the porous membrane 1 is 30 μm or more. The porous PTFE membrane of a related art has a disadvantage that, although the initial collection efficiency is high, the dust holding capacity is small due to a fiber stricture having many fibers with small fiber diameter. On the other hand, the porous membrane 1 of the filtering medium of this embodiment has a larger average fiber diameter and a fiber structure with larger gap between fibers compared to the porous PTFE membrane of a related art, and due to high membrane thickness, it has a fiber structure in which the amount of fiber having high fiber diameter is increased and a great amount of voids is present (with low filling ratio). By having this porous membrane, the filtering medium of this embodiment has excellent dust holding capacity like a filtering medium including glass fiber by satisfying the collecting performance as a HEPA filter as it maintains the pressure loss at low level while suppressing an adverse effect on the initial collection efficiency which is caused by large average fiber diameter. This performance and fiber structure are not obtained from a filtering medium in which a porous PTFE membrane of a related art, which includes homo PTFE, is used.

Further, by having high dust holding capacity, the filtering medium of this embodiment is not required to be formed with a pre-collecting layer which includes a melt-blown non-woven fabric or the like. Since a filtering medium for an air filter of a related art has a thinly drawn porous PTFE membrane and the liquid particles have small dust holding capacity, in order to increase the dust holding capacity of liquid particles, a filtering medium obtained by adhering a melt-blown (MB) fabric including polypropylene (PP) or the like with thickness of 300 μm or the like on the upstream side of the porous PTFE membrane has been suggested. However, this type of the filtering medium generates impurities from the melt-blown non-woven fabric, and thus it is likely to contaminate passing air flow. Further, as the thickness of the filtering medium is high in this type of the filtering medium, the area for inserting the folded filtering medium is small when an air filter unit is prepared by holding it in a frame body. On the other hand, because the filtering medium of this embodiment has high dust holding capacity as described above, the generation of impurities from a pre-collecting layer does not occur. Further, because it is unnecessary to form a pre-collecting layer, it is possible to ensure the area for inserting the folded filtering medium to the frame body at the time of manufacturing an air filter unit.

The filtering medium of the present embodiment is used for the uses and fields that are the same as those described for the first embodiment, except the field of liquid filtration.

Air filter unit

Next, the air filter unit using the aforementioned filtering medium is described.

The air filter unit is the same as the air filter unit illustrated in FIG. 4, which has been described in the first embodiment. For the processed filtering medium 21, the aforementioned filtering medium 9, the filtering medium 10, or the filtering medium 11 is used.

Figure 7:
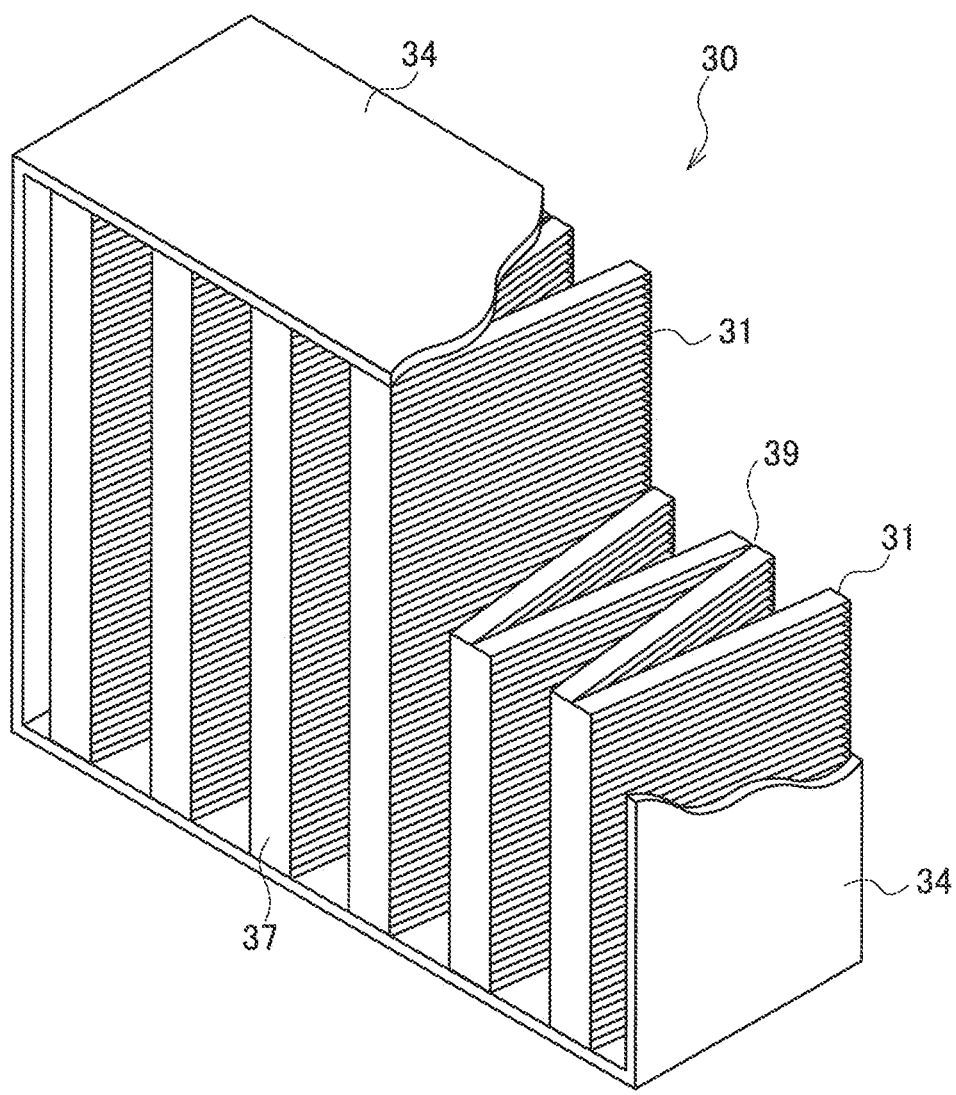
FIG. 7 is a drawing illustrating the appearance of the air filter unit according to a variation example of the second embodiment.

Further, the air filter unit using any one of the filtering medium 9 to 11 is not limited to the air filter unit 20 illustrated in FIG. 4, and it can be other type like the air filter unit 30 of V bank type illustrated in FIG. 7 (also referred to as double pleats type), or the like. FIG. 7 is a dimensional view illustrating the air filter unit 30 of V bank type which has been partially cut out. The air filter unit 30 includes the filtering medium 31, the pack receiver 37 and 39, and the frame body 34. For the filtering medium 31, the aforementioned filtering medium 9, the filtering medium 10, or the filtering medium 11 is used. The filtering medium 31 is obtained by performing a pleats processing of a sheet shape to zigzag shape, and by optionally providing a spacer composed of a hot melt resin or the like, it is processed into a filter pack. Plural filter packs are disposed inside the frame body 34 such that plural V-letter shapes are arranged in single direction, the end part of the airflow inlet side is supported by the pack receiver 37, and the end part of the outlet side is supported by the pack receiver 39.

Meanwhile, it is also possible in other embodiment that the air filter unit uses any one of the filtering medium 9 to 11 described above and it is manufactured as an air filter unit of the aforementioned mini pleats type.

By having any one of the aforementioned filtering medium 9 to 11 as the filtering medium 21 and 31, the air filter unit 20 and 30 has suppressed decrease in collecting performance even though the dust holding capacity is as large as that of the filtering medium including glass fiber. Further, by having high dust holding capacity, it is unnecessary to provide a pre-collecting layer, and thus it is possible to ensure the area for inserting the folded filtering medium to the frame body at the time of manufacturing an air filter unit without having impurities that are conventionally generated from a pre-collecting layer.

Method for Manufacturing Filtering Medium for Air Filter

Next, the method for manufacturing a filtering medium for an air filter is described.

Figure 8:
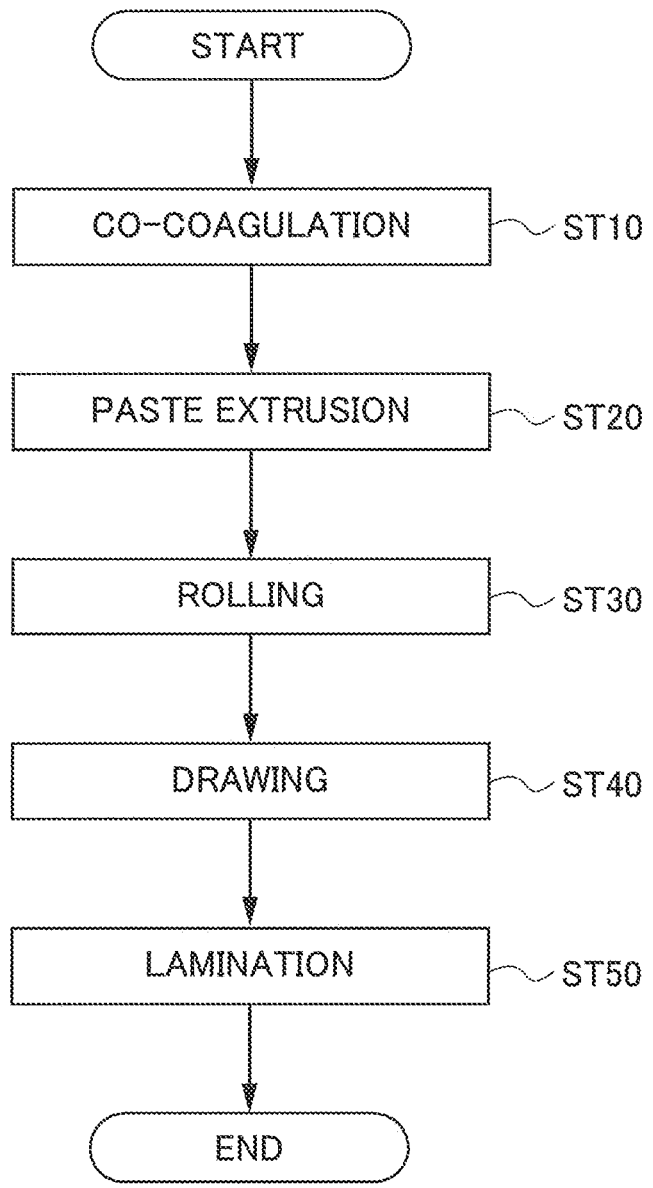
FIG. 8 is a drawing illustrating the method for manufacturing a filtering medium for an air filter including the method for manufacturing a porous membrane of the second embodiment.

In FIG. 8, the flow chart illustrating the method for manufacturing a filtering medium for an air filter including the method for manufacturing the porous membrane of this embodiment is illustrated. The method for manufacturing a filtering medium for an air filter includes a step of performing co-coagulation (ST10), a step of performing paste extrusion (ST20), a step of performing rolling (ST30), a step of performing drawing (ST40), and a step of performing lamination (ST50). Among them, the step of performing co-coagulation (ST10) to the step of performing drawing (ST40) correspond to one example of the method for manufacturing a porous membrane of this embodiment. Accordingly, a porous membrane is manufactured. With the step of performing co-coagulation (ST10), a material for molding, which is a raw material of the porous membrane, is manufactured.

Herein, the method for manufacturing a material for molding including the method for manufacturing a material for molding, which is performed during the step (ST100) for performing co-coagulation, is described. Herein, descriptions are given by having PTFE that can be fibrillated as the component A, the non-hot melt processable component that is not fibrillated as the component B, and the hot melt processable component that is not fibrillated as the component C. Meanwhile, descriptions are given for a case in which the component B is a component having thermoplastic property like low molecular weight PTFE.

The material for molding can be prepared as a composition like the mixed powder, and it can be manufactured various methods including the step of performing co-coagulation (ST10). For example, when the composition is mixed powder, there can be a method in which powder of each of the component A, the component B, and the component C is mixed using a common mixture or the like, a method obtaining co-coagulated powder by co-coagulation of aqueous dispersions each containing the component A, the component B, or the component C (that is, step of performing c-coagulation (ST10)), a method in which mixed powder obtained by co-coagulating in advance of an aqueous dispersion of any two components of the component A, the component B, and the component C with powder of the remaining one component by using a common mixer or the like, or the like. Desirable materials for performing the drawing can be obtained by any one of those methods. Among them, from the viewpoint of easy and homogeneous dispersion of the three different components, co-coagulating aqueous dispersions each containing the component A, the component B, or the component C, that is, obtaining by the step of performing co-coagulation (ST10), is preferable.

Examples of the co-coagulating method including the step of performing co-coagulation (ST10) include the method (i) to (iv) which have been described for the first embodiment. Among them, from the viewpoint of easy and homogeneous dispersion of the three components, the method (i) is preferable.

For the co-coagulation of the methods (i) to (iv) described above, the coagulation is preferably performed by adding an acid, a metal salt, or an organic solvent as it has been described in the first embodiment.

The shape of the component A before mixing is not particularly limited, but it is preferably an aqueous dispersion of high molecular weight PTFE described above. Examples of the high molecular weight PTFE include an aqueous dispersion like a commercially available product of high molecular weight PTFE which has been listed in the first embodiment.

The shape of the component B before mixing is not particularly limited, but it is preferably an aqueous dispersion when the component B is low molecular weight PTFE. The aqueous dispersion can be, in addition to an aqueous dispersion obtained by emulsion polymerization, molding powder or fine powder dispersed in water by using a surfactant of the like. Among them, from the viewpoint of the stability of an aqueous dispersion, an aqueous dispersion obtained by emulsion polymerization is preferably used. Examples of the low molecular weight PTFE include a commercially available product of low molecular weight PTFE or the like which has been listed in the first embodiment.

Further, even when the component B is an inorganic filler, the shape of the component B before mixing is preferably an aqueous dispersion. Examples of the inorganic filler include the commercially available product of inorganic fillers or the like which are listed in the first embodiment. They are used by dispersing powder in water after suitably performing a surface treatment using a silane coupling agent or the like, or the like. Among them, from the viewpoint of dispersibility in water, the secondary crushed product obtained by a jet mill (for example, "TALC P2") is preferably used.

Examples of the component C include each resin of non-cured silicone resin, acryl, urethane, and PET or the like in addition to a fluororesin like FEP and PFA. The shape before mixing is not particularly limited, but is it preferably an aqueous dispersion. As for the aqueous dispersion, in case of a resin obtained by emulsion polymerization, resin powder dispersed in water by using a surfactant or the like can be also used in addition to a dispersion directly usable after finishing polymerization. The hot melt processable component that is not fibrillated is prepared as an aqueous dispersion by dispersing a pre-determined amount in water such that it is contained at 0.1% or more but less than 20% by weight in a porous membrane.

With regard to the method for co-coagulation, it is preferable to apply mechanical stirring force after mixing three aqueous dispersions. At that time, the aforementioned acid, metal salt, organic solvent, or the like can be also used as a coagulating agent.

After the co-coagulation, an extrusion aid (that is, liquid lubricant) is mixed after performing dehydration and drying, followed by extrusion. The type and use amount of the liquid lubricant are the same as those described in the first embodiment.

The mixture obtained by co-coagulation is, after mixing with a liquid lubricant, extruded and rolled by a conventionally known method to be molded into a film shape product. The extrusion can be performed by paste extrusion (ST20), ram extrusion, or the like. Preferably, it is performed by paste extrusion. The rod shape extrudate extruded by paste extrusion is rolled under heating by using a calendar roll or the like under temperature condition of 40° C. to 80° C., for example (ST30). The thickness of the obtained rolled product in film shape is set based on the desired thickness of the porous membrane, and it is generally between 100 and 400 μm.

Herein, descriptions are given with regard to the paste extrusion (ST20).

Examples of the rod shape include a sheet shape, a column shape (also referred to as a round rod shape), or the like, which are elongated in one direction. The extrudate in rod shape is preferably in a sheet shape. With a sheet shape, morphological change is small when an unsintered film (also referred to as a raw tape) is subjected to a rolling processing so that a homogeneous raw tape can be easily obtained. As a result, the physical properties are homogeneous after processing into a porous membrane (also referred to as a drawn membrane) so that a porous membrane having little deviation in pressure loss when used for a filtering medium for an air filter can be obtained. The extrudate in sheet shape is formed by extruding from a sheet die (T die) which is installed on the tip of a paste extruder. The paste extruder has a round hole formed on the tip part, for connection to the internal space. The sheet die is formed with an extrusion hole, which is formed in rectangular shape when viewed from the direction in which the extrudate is extruded. For example, it has an extrusion hole having a size with length of 100 to 250 mm in length direction and length of 1 to 8 mm in width direction. According to extrusion from an extrusion hole with such shape, the extrudate is extruded in sheet shape. Meanwhile, by detaching the sheet die from a paste extruder, the extrudate is extruded in column shape.

Referring back to the step of performing rolling (ST30), the liquid lubricant is removed from an unsintered film as a rolled product. Removal of the liquid lubricant is performed in the same manner as those described in the first embodiment.

The extrudate from which the liquid lubricant is removed is drawn at a temperature which is equal to or higher than the melting temperature of the hot melt processable component that is not fibrillated but is equal to or lower than the decomposition temperature of the non-hot melt processable component that is not fibrillated (ST40). During this step, the component C is melt and later hardened in the knotted portions so that the strength of the porous membrane is increased in the thickness direction. The temperature for drawing can be set depending on the temperature of a furnace in which the drawing is performed or the temperature of a heating roller for conveying the rolled product. Alternatively, it may be realized by combining those settings. The drawing in length direction can be performed by using an apparatus illustrated in FIG. 5 of JP 2012-020274 A, for example. Further, the drawing in width direction can be performed with the left half part (tenter) of the apparatus illustrated in FIG. 6 of JP 2012-020274 A, for example.

The drawing includes drawing in the length direction (MD direction) of an extrudate and drawing in the width direction (TD direction) which is preferably perpendicular to the length direction. When the porous membrane is used for a filtering medium for an air filter, it is preferable to perform also the drawing in the width direction.

The rolled product is drawn at elongation area ratio of 40 or more but less than 150 times.

The drawing ratio in the length direction is 4 or more but less than 10 times. Each of the drawing speed in the length direction and drawing temperature has the same condition as those described in the first embodiment.

The drawing ratio in the width direction is more than 10 but less than 25 times. When the drawing ratio in the width direction is equal to or less than 10 times, the drawing cannot be performed favorably so that it becomes difficult to obtain a homogeneous porous membrane. Each of the drawing speed in the width direction and drawing temperature has the same condition as those described in the first embodiment. The drawing in the width direction can be performed either simultaneously or separately with the drawing in the length direction.

The porous membrane obtained accordingly is preferably subjected to thermal fixing to obtain increased strength or dimensional stability. The temperature at the time of thermal fixing can be equal to or higher, or lower than the melting point of PTFE. It is preferably 250 to 400° C.

During the step of performing lamination (ST50), an air permeable support is laminated on the obtained porous membrane. A non-woven fabric, a woven fabric, a metal mesh, a resin net, or the like which have been described above can be used as the air permeable support. The lamination can be performed by a conventionally know method. When non-woven fabric or the like is used as an air permeable support, for example, adhesion of the air permeable support 13 to the porous membrane 1 can be achieved by using the anchor effect based on partial melt of the air permeable support 13 by heating or melt of a hot melt resin or by using the adhesion with reactive adhesives or the like. Such lamination can be performed with the right half part (thermal lamination apparatus) of the apparatus illustrated in FIG. 6 of JP 2012-020274 A, for example. Further, the lamination between the porous membranes is performed as described in Example 4 with heating to around the melting temperature of PTFE.

Accordingly, a filtering medium for an air filter is obtained.

According to the method for manufacturing a filtering medium for an air filter described above, a filtering medium for an air filter having high dust holding capacity so as to have suppressed decrease in collecting performance and no occurrence of impurities is obtained. The filtering medium for an air filter of a related art which is used for a HEPA filter for air injection is required to have a low pressure loss value like 80 to 140 Pa or so. However, the porous PTFE membrane of a related art, which includes homo PTFE, has a thin membrane thickness even though the collection efficiency is high. Thus, even when a filtering medium with five layer structure as illustrated in FIG. 3 is manufactured, for example, the dust holding capacity is insufficient. Accordingly, by using a material for molding containing the non-hot melt processable component that is not fibrillated (component B) and the hot melt processable component that is not fibrillated (component C) as a raw material of a porous membrane, a porous membrane with large average fiber diameter and high membrane thickness and a fiber structure that is different from that of a porous PTFE membrane of a related art is obtained. However, it is found that, when the drawing ratio is high during manufacture of a porous membrane, the performance is deteriorated due to decreasing membrane thickness and also the collection efficiency is low for a porous membrane with single layer. As such, by lowering the drawing ratio and arbitrarily having a layer structure containing plural porous membranes, a filtering medium for an air filter which does not exist before and has a low pressure loss and significantly improved dust holding capacity without compromising the performance is obtained.

EXAMPLES

Hereinbelow, the first embodiment is specifically described by way of examples.

Example 1

66.5% by weight (in terms of polymer) of PTFE aqueous dispersion (PTFE-A) with SSG of 2.160, which was prepared based on the method described in Comparative Example 3 of WO 2005/061567 A, 28.5% by weight (in terms of polymer) of low molecular weight PTFE aqueous dispersion (PTFE-B) with melt viscosity of 20000 Pa·s measured by a flow tester method at 380° C., which was prepared based on the method described in WO 2009/020187 A, and 5% by weight (in terms of polymer) of FEP aqueous dispersion having melting temperature of 215° C., which was prepared based on the method described in JP 2010-235667 A, were admixed with one another. After adding 500 ml of 1% aqueous solution of aluminum nitrate as a coagulating agent followed by stirring, co-coagulation was performed. After removing the moisture from the produced powder by using a sieve, it was dried again for 18 hours in a heat wave furnace at 135° C. to obtain mixed powder with the aforementioned three components.

Subsequently, as a liquid lubricant for extrusion, the hydrocarbon oil (manufactured by Idemitsu Kosan Co., Ltd., "IP SOLVENT 2028") was added at 20° C. to the mixture in an amount of 25 parts by weight per 100 parts by weight of the mixture followed by mixing. Next, the obtained mixture was extruded using a paste extruder to obtain a molded product with a round rod shape. The molded product with a round rod shape was molded into a film shape using a calendar roll heated to 250° C. to obtain a PTFE film. The film was passed through a heat wave drying furnace at 250° C. to remove the hydrocarbon oil by evaporation, thus obtaining an unsintered band-shaped PTFE film having average thickness of 200 μm and average width of 150 mm. Next, the unsintered PTFE film was drawn in the length direction at drawing ratio of 5 times and drawing speed of 38%/second. The drawing temperature was 300° C. Next, the drawn but unsintered film was drawn in the width direction at drawing ratio of 13.5 times and drawing speed of 330%/second by using a tenter capable of continuous clipping followed by thermal fixing. At that time, the drawing temperature was 290° C. and the temperature for thermal fixing was 390° C. Accordingly, a porous membrane (filling ratio of 4.2%, average fiber diameter of 0.150 μm, and thickness of 38.6 μm) was obtained.

Subsequently, a spun-bond non-woven fabric (average fiber diameter of 24 μm, weight per unit area of 40 g/m², and thickness of 0.2 mm), which includes a fiber having a core/sheath structure in which PET is used for the core and PE is used for the sheath, was laminated as an air permeable support on both sides of the obtained porous membrane 1 by thermal fixing using a lamination apparatus. As a result, a filtering medium was obtained. Performances of the porous membrane and filtering medium as obtained above, that is, a pressure loss, a PF value, filter life span, membrane thickness decreasing rate, and dust holding capacity, and the like, were calculated.

Example 2

The processing and evaluation were made in the same manner as Example 1 except that an inorganic filler ("TALC P2" manufactured by Nippon Talc Co., Ltd.) is used instead of the PTFE aqueous dispersion with melt viscosity of 20000 Pa·s (PTFE-B) measured by a flow tester method at 380° C., the liquid lubricant is used at 29 parts by weight, and the drawing ratio in the width direction is changed to 20 times.

Comparative Example 1

The porous membrane and filtering medium were obtained and the filter performance was determined in the same manner as Example 1 by using PTFE aqueous dispersion (PTFE-A) with SSG of 2.160 except that the non-hot melt processable component that is not fibrillated and the hot melt processable component that is not fibrillated are not used, the liquid lubricant is used at 30 parts by weight, and the drawing ratio in the width direction is changed to 24 times.

Comparative Example 2

The processing and evaluation were made in the same manner as Example 1 except that the hot melt processable component that is not fibrillated is not used, the mixing ratio of PTFE that can be fibrillated and the non-hot melt processable component that is not fibrillated is changed (that is, 70% by weight of PTFE that can be fibrillated and 30% by weight of the non-hot melt processable component that is not fibrillated), and the drawing ratio in the width direction is changed to 20 times.

Comparative Example 3

The processing and evaluation were made in the same manner as Example 1 except that the non-hot melt processable component that is not fibrillated is not used, the mixing ratio polytetrafluoroethylene that can be fibrillated and the hot melt processable component that is not fibrillated is changed (that is, 90% by weight of PTFE that can be fibrillated and 10% by weight of the hot melt processable component that is not fibrillated), and the drawing ratio in the width direction is changed to 20 times.

Comparative Example 4

The processing and evaluation were made in the same manner as Example 1 except that the mixing ratio of each component in Example 1 is changed such that content of the hot melt processable component that is not fibrillated is 23% by weight.

Comparative Example 5

The processing and evaluation were made in the same manner as Example 1 except that the drawing temperature of Example 1 is changed to a temperature which is equal to or lower than the melting point of the hot melt processable component that is not fibrillated.

Example 3

The processing and evaluation were made in the same manner as Example 1 except that, with regard to Example 1, PFA with melting temperature of 315° C. is used as the hot melt processable component that is not fibrillated.

Example 4

The processing and evaluation were made in the same manner as Example 1 except that, with regard to Example 1, a silicone resin ("G-600" manufactured by Gamma Chemical Co., Ltd) is used as the hot melt processable component that is not fibrillated.

The measurement results of the above Examples 1 to 4 and Comparative Examples 1 to 5 are illustrated in Table 1 to 2.

Various performances illustrated in Table 1 to Table 3 were measured or calculated based on the following procedures.

Pressure Loss

1. Pressure Loss of Porous Membrane and Filtering Medium

A disc-shaped test sample having an effective area of 100 cm$^2$ was taken from the porous membrane 1. After setting the test example in a filtering medium holder with a column shape, applying pressure onto the inlet side using a compressor, and adjusting the air flow such that air passage rate through the filtering medium is 5.3 cm/second, the pressure was measured at the upstream side and downstream side of the test sample by using a manometer. As a result the difference in pressure between the upstream side and downstream side was obtained as a pressure loss of the porous membrane 1. By using the filtering medium which has been produced with the same porous membrane, the pressure loss was similarly obtained.

Further, the change ratio (%) of pressure loss between the porous membrane and filtering medium was calculated according to the following equation.

Change ratio (%)=(Pressure loss in filtering medium (Pa)−Pressure loss in porous membrane (Pa))/ Pressure loss in porous membrane (Pa)×100

2. Pressure Loss of Air Filter Unit

The air filter unit 20 was set in a rectangular duct for test, the air flow was adjusted to have wind flow amount of 56 m$^3$/minute, and the pressure was measured at the upstream side and downstream side of the air filter unit 20 by using a manometer. The difference in pressure between the upstream side and downstream side was obtained as a pressure loss of the air filter unit 20. Meanwhile, a separator type with 610 mm (length)×610 mm (width)×290 mm (inner length) was used as the air filter unit 20.

Collection Efficiency

NaCl particles were generated by using an atomizer and classified to 0.3 μm by an electrostatic classifier (manufactured by TSI), americium 241 was used to neutralize the particle charges, thereafter the flow rate at which particles passed through was adjusted to 5.3 cm/sec, a particle counter (CNC manufactured by TSI) was used to find the number of particles before and after the porous membrane 1, and the collection efficiency was calculated by the following equation.

Collection Efficiency (%)=(CO/CI)×100

CO=Number of particles of NaCl 0.3 μm captured by porous membrane 1
CI=Number of particles of NaCl 0.3 μm supplied to porous membrane 1

The collection efficiency was also calculated by using the filtering medium which was manufactured by using the same porous membrane.

PF Values

The PF values were obtained by using NaCl particles with particle diameter of 0.3 μm according to the following equation in view of the pressure loss and the collection efficiency (NaCl 0.3 μm) of the porous medium.

PF value=−log(Transmittance (%)/100)/Pressure loss (Pa)×1000

In the above equation, Transmittance=100−Collection efficiency (%)

Further, the change ratio of the PF value between the porous membrane and filtering medium was calculated according to the following equation.

Change ratio (%)=(*Pf* value of filtering medium−*PF* value of porous membrane)/*PF* value of porous membrane×100

The PF value was also calculated by using the filtering medium which was manufactured by using the same porous membrane.

Filter Life Span

1. Life Span of Porous Membrane and Filtering Medium

After continuously supplying NaCl particles to the porous membrane 1, the amount of NaCl particles (g/m$^2$) which was supplied until the pressure loss of the porous membrane is increased to 100 Pa was measured, and it was taken as the life span of the porous membrane. The effective filtering area of the porous membrane used was 50 cm$^2$. The pressure loss was measured as described above. The amount of the NaCl particles was obtained by subtracting the initial mass from the mass of the sample filtering medium after the increase of 100 Pa according to the test.

Further, the change ratio of the filter life span between the porous membrane and filtering medium was calculated according to the following equation.

Change ratio (%)=(Life span of filtering medium (g/m$^2$)−Life span of porous membrane (g/m$^2$))/ Life span of porous membrane (g/m$^2$)×100

The life span (g/m$^2$) was also calculated by using the filtering medium which was manufactured by using the same porous membrane.

2. Life Span of Air Filter Unit

The air filter unit 20 of a separator type with 610 mm (length)×610 mm (width)×290 mm (inner length) was produced and installed in a test duct. As for the filtering medium, a medium undergone the pleats processing with a folded and inserted area of 24 m$^2$ was used. The captured dust amount (g/m$^2$) until the initial pressure loss increases to 250 Pa was calculated according to the following equation and taken as the filter life span.

Captured dust amount (g/m$^2$)=Increased amount of filter weight (g/unit)/Area of filtering medium (m$^2$/unit)

Membrane Thickness Decreasing Rate

By using a measurement device in which a flat detector (Part No. 101117) with diameter of 10 mm (bottom area of 78.5 mm×2) is attached to a digital linear gauge (LGK-0510 manufactured by Mitutoyo Co., Ltd.), the membrane thickness change with application of pressure of 6.4 kPa in a direction which is perpendicular to the membrane surface was continuously (0.1 Hz) recorded by using a data logger. The membrane thickness decreasing amount during 0.5 seconds after the detector contacts the membrane was measured from the recorded data, and the membrane thickness decreasing rate (μm/second) was calculated.

Power Consumption Amount and Energy Saving Effect

According to the following equation, the consumed power (kWh) was calculated as powder consumption amount accompanied with ventilation. As for the pressure loss, the initial pressure loss value was used.

Power consumption (kWh)=Wind amount (m³/minute)×Pressure loss (Pa)×Ventilation time (h)/Fan efficiency (−)×1000

Herein, Fan efficiency=0.7.

The energy saving effect (1000 yen/year) for the case of using the air filter unit 20 compared to a case of using an air filter unit in which a filtering medium made of glass fiber was calculated according to the following procedures.

(a) For example, the power consumption for a case of using a HEPA filter (separator type) in which a filtering medium made of glass fiber with pressure loss of 275 Pa is used was calculated according to the following equation.

Power consumption (KWh)=56/60 (m³/second)×275 (Pa)×8760 (h)/(0.7(−)×1000)≈3250 KWh (b) For example, the power consumption for a case of using the product of the present invention (separator type) with pressure loss of 150 Pa was calculated according to the following equation.

Power consumption (KWh)=56/60 (m³/second)×150 (Pa)×8760 (h)/(0.7(−)×1000)≈1800 KWh Based on the above, when the electricity bill is assumed to be 14 Yen/KWh, it is possible to evaluate that the energy saving effect corresponds to (3250−1800)×14 s 20300 Yen/year.

TABLE 1

|  |  | Example 1 | Example 2 | Comparative Example 1 | Comparative Example 2 | Comparative Example 3 |
|---|---|---|---|---|---|---|
| Raw material | Component A/% by weight | PTFE-A/66.5 | PTFE-A/66.5 | PTFE-A/100 | PTFE-A/70 | PTFE-A/90 |
|  | Component B/% by weight | PTFE-B/28.5 | Talc/28.5 | — | PTFE-B/30 | — |
|  | Component C/% by weight | FEP/5 | FEP/5 | — | — | FEP/10 |
| Conditions for producing | Amount of aids (parts by weight) | 25 | 29 | 30 | 25 | 25 |
|  | Thickness of unsintered film (μm) | 200 | 200 | 200 | 200 | 120 |
|  | Longitudinal drawing Temperature (° C.) | 300 | 300 | 300 | 300 | 300 |
|  | Ratio (times) | 5 | 5 | 5 | 5 | 5 |
|  | Drawing speed (%/second) | 38 | 38 | 38 | 38 | 38 |
|  | Horizontal drawing Temperature (° C.) | 290 | 290 | 290 | 290 | 290 |
|  | Ratio (times) | 13.5 | 20 | 24 | 20 | 20 |
|  | Drawing speed (%/second) | 330 | 330 | 330 | 330 | 330 |
|  | Elongation area ratio (times) | 67.5 | 100 | 120 | 100 | 100 |
|  | Temperature for thermal fixing(° C.) | 390 | 390 | 390 | 390 | 390 |
|  | Filling ratio of porous membrane (%) | 4.2 | 5.0 | 5.4 | 4.1 | 5.5 |
| Pressure loss | Porous membrane (Pa) | 67 | 133 | 133 | 71 | 80 |
|  | Filtering medium (Pa) | 77 | 141 | 169 | 105 | 117 |
|  | Change ratio(%) | +15 | +6 | +27 | +48 | +46 |
| PF value | Porous membrane | 27.1 | 23.7 | 32.9 | 24.7 | 24.8 |
|  | Filtering medium | 25.3 | 24.1 | 23.3 | 18.8 | 19.6 |
|  | Change ratio(%) | −7 | +2 | −29 | −24 | −21 |
| Filter life span | Porous membrane (g/m²) | 1.57 | 1.25 | 1.12 | 1.21 | 1.23 |
|  | Filtering medium (g/m²) | 1.52 | 1.23 | 0.81 | 0.89 | 0.93 |
|  | Change ratio(%) | −3 | −2 | −28 | −26 | −24 |
|  | Membrane thickness decreasing rate (μm/s) | −1.1 | −0.6 | −2.5 | −3.0 | −2.9 |

TABLE 2

|  |  | Comparative Example 4 | Comparative Example 5 | Example 3 | Example 4 |
|---|---|---|---|---|---|
| Raw material | Component A/% by weight | PTFE-A/54 | PTFE-A/66.5 | PTFE-A/66.5 | PTFE-A/66.5 |
|  | Component B/% by weight | PTFE-B/23 | Talc/28.5 | Talc/28.5 | Talc/28.5 |
|  | Component C/% by weight | FEP/23 | FEP/5 | PFA/5 | Silicone/5 |
| Conditions for producing | Amount of aids (parts by weight) | 25 | 25 | 25 | 25 |
|  | Thickness of unsintered film (μm) | 200 | 200 | 200 | 200 |
|  | Longitudinal drawing Temperature (° C.) | Impossible to draw | 200 | 300 | 300 |
|  | Ratio (times) | Impossible to draw | 5 | 5 | 5 |
|  | Drawing speed (%/second) | Impossible to draw | 38 | 38 | 38 |

TABLE 2-continued

|  |  | Comparative Example 4 | Comparative Example 5 | Example 3 | Example 4 |
|---|---|---|---|---|---|
| Horizontal drawing | Temperature (° C.) | — | 200 | 290 | 290 |
|  | Ratio (times) | — | 13.5 | 13.5 | 13.5 |
|  | Drawing speed (%/second) | — | 330 | 330 | 330 |
| Elongation area ratio (times) |  | — | 67.5 | 67.5 | 67.5 |
| Temperature for thermal fixing(° C.) |  | — | 200 | 390 | 390 |
| Filling ratio of porous membrane(%) |  | — | 4.1 | 4.3 | 4.2 |
| Pressure loss | Porous membrane (Pa) | — | 114 | 82 | 94 |
|  | Filtering medium (Pa) | — | 154 | 96 | 112 |
|  | Change ratio(%) | — | +35 | +17 | +19 |
| PF value | Porous membrane | — | 26.3 | 28.2 | 27.8 |
|  | Filtering medium | — | 20.1 | 26.2 | 24.7 |
|  | Change ratio(%) | — | −24 | −7 | −11 |
| Filter life span | Porous membrane (g/m$^2$) | — | 1.18 | 1.44 | 1.45 |
|  | Filtering medium (g/m$^2$) | — | 0.92 | 1.39 | 1.34 |
|  | Change ratio(%) | — | −22 | −3 | −8 |
| Membrane thickness decreasing rate (μm/s) |  | — | −2.9 | −1.2 | −1.5 |

As clearly seen in Tables 1 and 2, Comparative Example 1 not containing the non-hot melt processable component that is not fibrillated and the hot melt processable component that is not fibrillated showed significantly lowered pressure loss, PF value, and filter life span according to the lamination of an air permeable support, indicating a deterioration of filter performance. The membrane thickness decreasing rate was also high and the strength of the porous membrane was insufficient.

Comparative Example 2 not containing the hot melt processable component that is not fibrillated and Comparative Example 3 not containing the non-hot melt processable component that is not fibrillated allow the manufacture of a porous membrane having the filling ratio that is almost the same as that of Example 1. However, the pressure loss or the like was significantly lowered like Comparative Example 1, indicating a deterioration of filter performance. The membrane thickness decreasing rate was also high and the strength of the porous membrane was insufficient.

Further, Comparative Example 4 in which the content of the hot melt processable component that is not fibrillated is 20% by weight or more cannot allow the manufacture of a porous membrane.

On the other hand, the pressure loss, PF value, and change in filter life span were small in Example 1 to 4, and a deterioration of filter performance was suppressed. The membrane thickness decreasing rate was also small and the strength of the porous membrane was significantly improved.

Example 5 and Comparative Example 6 and 7

By using the filtering medium prepared in Example 1, an air filter unit of separator type was manufactured (Example 5) and it was compared to the air filter unit (Comparative Examples 6 and 7), which was manufactured by using a filtering medium of a related art, in terms of pressure loss and life span.

With regard to the air filter unit of Example 5, a processed filtering medium with a zigzag shape was produced by subjecting each filtering medium to a pleats processing with a rotary type folding machine such that it can have outer folding and inner folding at every 260 nm in the length direction. Then, a separator obtained by corrugation processing of an aluminum plate was inserted to a valley part of the filtering medium to obtain a filter pack with length of 590 mm×width of 590 mm. The number of pleats was 160 (80 peaks). The obtained filter pack was fixed onto a frame body made of aluminum having outer dimension as follows: 610 mm (length)×610 mm (width)×290 mm (inner length). Periphery of the filter pack was attached to the frame body with urethane adhesives. The pressure loss, filter life span, power consumption amount, and energy saving effect of the air filter unit were calculated.

In Comparative Example 6, the processing and evaluation were made in the same manner as Example 5 except that, instead of a filtering medium and a separator, a HEPA filtering medium including glass fiber is installed inside the frame body. The average fiber diameter of glass fiber was about 0.5 μm.

In Comparative Example 7, the processing and evaluation were made in the same manner as Example 5 except that a HEPA filtering medium laminated with a pre-collecting layer including polypropylene, which was obtained by a melt blown method, at the upstream side of a HEPA filter made of common PTFE (average fiber diameter of about 70 nm) is used. The average fiber diameter of the pre-collecting layer was about 1.1 μm.

The measurement results of above Example 5 and Comparative Examples 6 and 7 are presented in Table 3.

TABLE 3

|  | Example 5 | Comparative Example 6 | Comparative Example 7 |
|---|---|---|---|
| Filtering medium | Filtering medium of Example 1 | Glass HEPA | PP melt blown + PTFE membrane HEPA |
| Pressure loss (Pa) | 175 | 350 | 250 |
| Filter life span (g/m$^2$) | 10 | 110 | 10 |
| Power consumption amount (kwh) | 1800-2100 | 3250-4100 | 2500-2950 |
| Energy saving effect (1000 Yen/year) | 20-28 | — | 10-16 |

As clearly shown in Table 3, the filtering medium produced according to the present invention has lower pressure loss compared to a glass filtering medium and also has significantly improved dust holding capacity (that is, filter life span) which has been remained as a problem of PTFE filtering medium of a related art, showing almost the same capacity as the glass filtering medium. Further, a filter with long life span can be manufactured due to low pressure loss. As a result, a significant energy saving can be achieved compared to a filtering medium of a related art (Comparative Examples 6 and 7)

Next, the second embodiment is specifically described in view of examples.

Example 11

66.5% by weight (in terms of polymer) of PTFE aqueous dispersion (PTFE-A) with SSG of 2.160, 28.5% by weight (in terms of polymer) of low molecular weight PTFE aqueous dispersion (PTFE-B) with melt viscosity of 20000 Pa·s which is measured by a flow tester method at 380° C., and 5% by weight (in terms of polymer) of FEP aqueous dispersion having melting temperature of 215° C. were admixed with one another. After adding 500 ml of 1% aqueous solution of aluminum nitrate as a coagulating agent followed by stirring, co-coagulation was performed. After removing the moisture from the produced powder by using a sieve, it was dried again for 18 hours in a heat wave furnace at 135° C. to obtain mixed powder with the aforementioned three components.

Subsequently, as a liquid lubricant for extrusion, the hydrocarbon oil (manufactured by Idemitsu Kosan Co., Ltd., "IP SOLVENT 2028") was added at 20° C. in an amount of 32 parts by weight per 100 parts by weight of the mixture followed by mixing. Next, the obtained mixture was extruded using a paste extruder to obtain a molded product with a sheet shape. At the tip of the paste extruder, a sheet die formed with a rectangular extrusion outlet having width direction length of 2 mm×length direction length of 150 mm was added. The molded product with a sheet shape was molded into a film shape using a calendar roll heated to 70° C. to obtain a PTFE film. The film was passed through a heat wave drying furnace at 250° C. to remove the hydrocarbon oil by evaporation, thus obtaining an unsintered PTFE film with band shape having average thickness of 300 μm and average width of 150 mm. Next, the unsintered PTFE film was drawn in the length direction at drawing ratio of 5 times and drawing speed of 40 second. The drawing temperature was 300° C. Next, the drawn but unsintered film was drawn in the width direction at drawing ratio of 13.5 times and drawing speed of 162%/second by using a tenter capable of continuous clipping followed by thermal fixing. At that time, the drawing temperature was 290° C. and the temperature for thermal fixing was 390° C. Accordingly, a porous membrane (filling ratio of 4.0%, average fiber diameter of 0.105 μm, and thickness of 55.0 m) was obtained.

Subsequently, by using a spun-bond non-woven fabric "Elebes S0303WDO" (manufactured by Unitika Ltd., average fiber diameter of 24 μm, weight per unit area of 30 g/m², and thickness of 0.15 mm), which includes a fiber having a core/sheath structure in which PET is used for the core and PE is used for the sheath, and laminating alternately two layers of the porous membrane 1 and three layers of the non-woven fabric by thermal fixing using a lamination apparatus, a filtering medium with five layer structure, which is the same as the one illustrated in FIG. 5, was obtained. Pressure loss, collection efficiency, and dust holding capacity of the obtained filtering medium were measured. Further, the change in collection efficiency when applied with liquid particles was measured. The dust holding capacity (PAO) of the filtering medium was 24.0 g/m² and dust holding capacity (NaCl) was 4.5 g/m².

Example 12

The processing and evaluation were made in the same manner as Example 11 except that the drawing is performed by using a tenter with the drawing ratio of 15 times in the width direction and the drawing speed of 180%/second.

Example 13

The processing and evaluation were made in the same manner as Example 11 except that the unsintered film is drawn at drawing ratio of 7.5 times in the length direction and drawing speed of 125/second and the drawing is performed by using a tenter with the drawing ratio of 15 times in the width direction and the drawing speed of 180%/second.

Example 14

The drawing was performed in the same manner as the unsintered film of Example 11 while overlapping two layers of the unsintered PTFE film produced and performing the drawing with the drawing ratio of 7.5 times in the length direction and the drawing speed of 125%/second. The drawing temperature was 300° C. Next, the drawn but unsintered film was drawn in the width direction at drawing ratio of 15 times and drawing speed of 180%/second by using a tenter capable of continuous clipping followed by thermal fixing. At that time, the drawing temperature was 290° C. and the temperature for thermal fixing was 390° C. Thereafter, by attaching the air permeable support used in Example 11 to both sides (outer layer sides) of the obtained porous membrane with two layers by thermal fixing using a lamination apparatus, the filtering medium with four layer structure as illustrated in FIG. 6 was obtained. The obtained filtering medium was evaluated in the same manner as Example 11.

Comparative Example 11

The processing and evaluation were made in the same manner as Example 11 except that the drawing is performed by using a tenter with the drawing ratio of 28 times in the width direction and the drawing speed of 347%/second.

Comparative Example 12

The processing and evaluation were made in the same manner as Example 11 except that PTFE aqueous dispersion (PTFE-A) with SSG of 2.160 is used but the hot melt processable component that is not fibrillated and the non-hot melt processable component that is not fibrillated are not used, 32 parts by weight of liquid lubricant for extrusion is added followed by mixing, and the drawing is performed by using a tenter with the drawing ratio of 24 times in the width direction and the drawing speed of 298%/second.

Comparative Example 13

The processing and evaluation were made in the same manner as Example 11 except that the hot melt processable component that is not fibrillated is not used, the mixing ratio between PTFE that can be fibrillated and the non-hot melt processable component that is not fibrillated is changed (that is, 70% by weight (in terms of polymer) of PTFE aqueous dispersion (PTFE-A) with SSG of 2.160 and 30% by weight (in terms of polymer) of low molecular weight PTFE aqueous dispersion (PTFE-B) with melt viscosity of 20000 Pa·s which is measured by a flow tester method at 380° C.), and the drawing is performed by using a tenter with the drawing ratio of 20 times in the width direction and the drawing speed of 248%/second.

Comparative Example 14

The processing and evaluation were made in the same manner as Example 11 except that the non-hot melt processable component that is not fibrillated is not used, the mixing ratio between PTFE that can be fibrillated and the hot melt processable component that is not fibrillated is changed (that is, 90% by weight (in terms of polymer) of PTFE aqueous dispersion (PTFE-A) with SSG of 2.160 and 10% by weight (in terms of polymer) of aqueous dispersion of FEP with melting temperature of 215° C.), and the drawing is performed by using a tenter with the drawing ratio of 20 times in the width direction and the drawing speed of 248%/second.

Reference Example 1

By using a glass filtering medium for HEPA ("HB-7633" manufactured by H&V) as a filtering medium, the performance was evaluated. The dust holding capacity (PAO) of the filtering medium was 25.0 g/m² and the dust holding capacity (NaCl) was 5.3 g/m². Meanwhile, the raw material component, conditions for producing, and porous membrane are omitted for Reference example 1 of Table 4.

The measurement results of above Examples 11 to 14, Comparative Examples 11 to 14 and Reference example 1 are presented in Table 4 and Table 5.

Meanwhile, various performances presented in Table 4 and Table 5 were measured or calculated according to the following procedure.

Filling Ratio

The filling ratio of porous membrane was calculated according to the following equation.

Filling ratio (%)=(Specific gravity of porous membrane)/(Specific gravity of raw material)×100

Specific gravity of porous membrane=(Weight of porous membrane)/(Membrane thickness of porous membrane× Area of porous membrane)

Meanwhile, for a mixed raw materials which include plural components, the specific gravity of the raw material is represented by a value which is obtained by dividing the sum of the product of gravity of each component with weight ratio of each component by the sum of the weight ratio.

Average Fiber Diameter

The surface of the porous membrane was photographed by scanning electron microscopy (SEM). It was then obtained by measuring fiber diameter for 10 or more areas from the obtained photograph and calculating the average value of the measured values.

Average Pore Diameter

The average pore diameter (mean flow pore size) measured on the basis of the description of ASTM F316-86 was used as the average pore diameter of the porous membrane. Actual measurement was performed by using Coulter Porometer [manufactured by Coulter Electronics, England].

Membrane Thickness

By using a film thickness tester (type 1D-110MH, manufactured by Mitutoyo Co., Ltd.), the membrane pressure of the five overlapped porous membranes as a whole was measured. The resulting value was divided by 5 to give the membrane thickness of one porous membrane. The membrane thickness indicates the membrane thickness relative to one porous membrane as a whole (that is, average membrane thickness).

Pressure Loss

A test sample of the filtering medium was set in a filter holder with diameter of 100 mm. The inlet side was pressurized using a compressor and the air flow amount was set at 5.3 cm/second by using a flow meter. The pressure loss at that time was measured by using a manometer.

Collection Efficiency (NaCl Particles with Particle Diameter of 0.3 μm)

NaCl particles were generated by using an atomizer according to the method described in method for generating 5 (normal) NaCl aerosol described in the attachment of JIS B9928 and classified to 0.3 μm by an electrostatic classifier (manufactured by TSI). Then, americium 241 was used to neutralize the particle charges, thereafter the flow rate at which particles passed through was adjusted to 5.3 cm/sec, a particle counter (CNC manufactured by TSI) was used to find the number of particles before and after the porous membrane as a test sample, and the collection efficiency was calculated by the following equation.

Collection efficiency (%)=(CO/CI)×100

CO=Number of particles of NaCl 0.3 μm captured by test sample
CI=Number of particles of NaCl 0.3 μm supplied to test sample Collection Efficiency (NaCl Particles with Particle Diameter of 0.1 μm)

The collection efficiency was calculated in the same manner as the calculating the collection efficiency for NaCl particles with particle diameter of 0.3 μm except that the NaCl particles with particle diameter of 0.1 μm are used instead of the NaCl particles with particle diameter of 0.3 μm.

PF Value (NaCl Particles with Particle Diameter of 0.3 μm)

By applying the above pressure loss and collection efficiency of the filtering medium (NaCl 0.3 μm) to the following equation. PF value was obtained.

PF value (NaCl particles with particle diameter of 0.3 μm)=−log(Transmittance (%)/100)/Pressure loss (Pa)×1000

In the formula, Transmittance=100−Collection efficiency (%)

PF Value (NaCl Particles with Particle Diameter of 0.1 μm)

The PF value was calculated in the same manner as the obtainment of the PF value (NaCl particles with particle diameter of 0.3 μm) except that the collection efficiency (NaCl particles with particle diameter of 0.1 pm) is inserted of the collection efficiency (NaCl particles with particle diameter of 0.3 μm).

Dust Holding Capacity with Polyalphaolefin (PAO) (Liquid Particles)

Evaluation was made based on the pressure loss build-up test at the time of passage of PAO particles. That is, pressure loss when air including PAO particles was continuously passed at a flow rate of 5.3 cm/sec through a sample filtering medium with an effective filtration area of 50 cm² was measured over time with a differential pressure gauge (U-tube manometer), and when pressure loss increased to 250 Pa, the dust holding capacity (g/m$^2$), which is the weight of the PAO particles held in the filtering medium per unit area of the filtering medium, was obtained. As for the PAO particles, PAO particles (with a count median diameter of 0.25 pin) generated with a Laskin nozzle were used, and the concentration of the PAO particles was about 1,000,000 to 6,000,000/cm$^3$.

Although there is no dust holding capacity defined for a HEPA filtering medium, it is generally believed that the initial filter pressure loss is about 250 Pa or less for a HEPA unit and, with regard to the filter exchange time, the time point at which the loss is more than two times the initial filter pressure loss is generally recommended. Further, the initial pressure loss of a glass filtering medium for a standard HEPA is about 250 to 300 Pa. For such reasons, the time point at which the pressure loss is increased to 250 Pa was taken as the end point of the above test for evaluating the dust holding capacity of the filtering medium.

Dust Holding Capacity with NaCl (Solid Particles)

Evaluation was made based on the pressure loss build-up test at the time of passage of NaCl particles. That is, pressure loss when air including NaCl particles was continuously passed at a flow rate of 5.3 cm/sec through a sample filtering medium with an effective filtration area of 50 cm$^2$ was measured over time with a differential pressure gauge (U-tube manometer), and when pressure loss increased to 250 Pa, the dust holding capacity (g/m$^2$), which is the weight, per unit area of the filtering medium, of the NaCl particles held in the filtering medium, was obtained. As for the NaCl particles, NaCl particles (with a count median diameter of 0.05 μm) generated with a Laskin nozzle were used, and the concentration of the NaCl particles was about 1,000,000 to 3,000,000/cm$^3$.

Coefficient of Variation

From a long filtering medium wound in a roll shape (length in width direction: 650 mm), a part of 5 m or so including the tip area was collected. For 100 areas with lattice shape which is obtained dividing into 25 sections at every 200 mm in the length direction of the filtering medium and dividing again into 4 sections at every 130 mm in the width direction excluding the two ends, the pressure loss was measured by using a filter holder with diameter of 100 mm. Herein, the pressure loss measurement was performed by continuous measurement of plural areas in lattice shape by using a measurement apparatus provided with at least five filter holders in the width direction of the filtering medium while moving the filtering medium in the length direction. Subsequently, the standard deviation was obtained from the pressure loss distribution which includes the measured pressure losses. Further, by dividing the obtained standard deviation with the average pressure loss in every measured area, the coefficient of variation (%) was obtained.

Drawing Speed (%/Second)

When the length in the drawing direction before drawing is L0 and the length in the drawing direction after drawing is L1, the drawing ratio (%) obtained by the following equation was divided by the time T (second) required for the drawing.

Drawing ratio (%)=$L/L0$×100

Drawing speed (%/second)=Drawing ratio (%)/Time T required for the drawing (second)

Meanwhile, in Table 4 and Table 5, the "raw material" means the raw material of the porous membrane, the "co-coagulated product" means a material for molding including the polytetrafluoroethylene that can be fibrillated, the non-hot melt processable component that is not fibrillated, and the hot melt processable component with a melting point of lower than 320° C. that is not fibrillated that are described above, and the "homo PTFE" indicates the homo PTFE for producing a porous PTFE membrane of a related art.

When there is a description of "×2" behind the number representing the ratio of a column "length drawing ratio", it means that two pieces of the unsintered film were overlapped and drawn according to the designated drawing ratio at the time of the drawing in length direction.

The number indicated in the column "layer structure" means the number of layers. When the number of layer is 5 and there is only one number in the column "length drawing ratio", it means that two pieces of the porous membrane having the same drawing ratio are used.

The description "measurement limit" means that it is more than the upper limit which can be measured.

TABLE 4

| | | Example 11 | Example 12 | Example 13 | Example 14 |
|---|---|---|---|---|---|
| Raw material | | Co-coagulated product | Co-coagulated product | Co-coagulated product | Co-coagulated product |
| Raw material component | Component A (% by weight) | 66.5 | 66.5 | 66.5 | 66.5 |
| | Component B (% by weight) | 28.5 | 28.5 | 28.5 | 28.5 |
| | Component C (% by weight) | 5 | 5 | 5 | 5 |
| Conditions for producing | Length drawing ratio (times) | 5 | 5 | 7.5 | 7.5 × 2 |
| | Drawing ratio in width direction (times) | 13.5 | 15 | 15 | 15 |
| | Elongation area ratio (times) | 67.5 | 75 | 112.5 | 112.5 |
| Porous membrane | Filling ratio(%) | 4.0 | 4.0 | 4.0 | 4.0 |
| | Average fiber diameter (μm) | 0.105 | 0.100 | 0.108 | 0.110 |
| | Thickness of one layer of porous membrane (μm) | 55 | 50 | 52 | 45 |
| | Thickness of porous membrane in total (μm) | 110 | 100 | 104 | 90 |
| Filtering medium | Layer structure | 5 | 5 | 5 | 4 |
| | Pressure loss (Pa) | 155 | 152 | 148 | 150 |
| | Collection efficiency(%) 0.3 μm NaCl | 99.99874 | 99.99949 | 99.99874 | 99.99673 |
| | 0.1 μm NaCl | 99.94441 | 99.94214 | 99.95919 | 99.92921 |
| | PF value 0.3 μm NaCl | 31.6 | 34.8 | 33.1 | 29.9 |
| | 0.1 μm NaCl | 21.0 | 21.3 | 22.9 | 21.0 |
| | Dust holding capacity (PAO, when increased to 250 Pa) (g/m$^2$) | 24 | 23.5 | 22 | 23.4 |
| | Coefficient of variation(%) | 4.6 | 4.0 | 3.7 | 4.1 |

TABLE 5

| | | Comparative Example 11 | Comparative Example 12 | Comparative Example 13 | Comparative Example 14 | Reference example 1 |
|---|---|---|---|---|---|---|
| Raw material | | Co-coagulated product | Homo PTFE | Raw material for comparison | Raw material for comparison | Glass HEPA |
| Raw material component | Component A (% by weight) | 66.5 | 100 | 70 | 90 | |
| | Component B (% by weight) | 28.5 | — | 30 | — | |
| | Component C (% by weight) | 5 | — | — | 10 | |
| Conditions for producing | Length drawing ratio (times) | 5 | 5 | 5 | 5 | |
| | Drawing ratio in width direction (times) | 28 | 24 | 20 | 20 | |
| | Elongation area ratio (times) | 140 | 120 | 100 | 100 | |
| Porous membrane | Filling ratio(%) | 4.0 | 5.5 | 6.0 | 15.0 | |
| | Average fiber diameter (μm) | 0.079 | 0.07 | 0.069 | 0.053 | |
| | Thickness of one layer of porous membrane (μm) | 28 | 18 | 32 | 28 | |
| | Thickness of porous membrane in total (μm) | 56 | 36 | 64 | 56 | |
| Filtering medium | Layer structure | 5 | 5 | 5 | 5 | |
| | Pressure loss (Pa) | 136 | 318 | 186 | 199 | 300 |
| | Collection efficiency 0.3 μm NaCl | 99.99695 | Measurement limit | 99.99827 | 99.998 | 99.9875 |
| | 0.1 μm NaCl | 99.8916 | Measurement limit | 99.94674 | 99.99747 | 99.9600 |
| | PF value 0.3 μm NaCl | 33.2 | — | 25.6 | 39.8 | 13.0 |
| | 0.1 μm NaCl | 21.8 | — | 17.6 | 23.1 | 11.3 |
| | Dust holding capacity (PAO, 250 Pa During build-up) (g/m²) | 19.0 | 5.6 | 8.0 | 5.4 | 25.0 |
| | Coefficient of variation(%) | 6.5 | 8.8 | 9.8 | 9.5 | 3.8 |

As presented in Table 4 and Table 5, the drawing ratio in width direction was high, that is, more than 25 times, and the drawing speed was fast in Comparative Examples 11, and thus the porous membrane was excessively thin and the fiber diameter was small so that the dust holding capacity with PAO was low.

With regard to the filtering medium of Comparative Example 12 which uses the homo PTFE as a raw material, the occurrence of thin fiber was not suppressed so that the pressure loss was high. Further, the membrane thickness was thin and the dust holding capacity was low.

With regard to the filtering medium of Comparative Example 13 which uses a raw material not containing the hot melt processable component that is not fibrillated, the dust holding capacity was low. In this regard, it is believed that the dust holding capacity of the filtering medium is lowered due to compression of the membrane during a post step as caused by the absence of the hot melt processable component.

With regard to the filtering medium of Comparative Example 14 which uses a raw material not containing the non-hot melt processable component that is not fibrillated, the dust holding capacity was low. In this regard, it is believed that the dust holding capacity of the filtering medium is lowered due to insufficient suppression of an occurrence of thin fiber as caused by the absence of the non-hot melt processable component that is not fibrillated.

Hereinabove, the filtering medium for an air filter, air filter unit, and method for manufacturing a porous membrane of the present invention are described in detail. However, the present invention is not limited to above embodiments, and without departing from the main spirit of the present invention, various improvements or modifications can be surely made.

Hereinabove, the composition, mixed powder, material for molding, porous membrane, a filtering medium for an air filter, air filter unit, and method for manufacturing a porous membrane of the present invention are described in detail. However, the present invention is not limited to above embodiments, and without departing from the main spirit of the present invention, various improvements or modifications can be surely made.

What is claimed is:

1. A mixed powder having polytetrafluoroethylene as a main component, the mixed powder comprising:
    polytetrafluoroethylene that can be fibrillated;
    a non-hot melt processable component that is not fibrillated; and
    a hot melt processable component with a melting point lower than 320° C. that is not fibrillated,
    the non-hot melt processable component that is not fibrillated being contained in a range of 20 to 40% by weight of a total weight of the mixed powder,
    the hot melt processable component being contained at equal to or more than 0.1% weight but less than 20% by weight of the total weight of the mixed powder, and
    the non-hot melt processable component that is not fibrillated being at least one of low molecular weight polytetrafluoroethylene, a thermosetting resin, and an inorganic filler.

2. The mixed powder according to claim 1, wherein the hot melt processable component that is not fibrillated is at least one of a fluororesin, a silicone, a polystyrene, a polyethylene terephthalate, a polyester, a polyamide, an acrylic resin, an urethane resin, and a mixture thereof.

3. A material for molding having polytetrafluoroethylene as a main component, the material for molding comprising:
    polytetrafluoroethylene that can be fibrillated;
    a non-hot melt processable component that is not fibrillated; and
    a hot melt processable component with a melting point lower than 320° C. that is not fibrillated, the non-hot melt processable component that is not fibrillated being contained in a range of 20 to 40% by weight of a total weight of the material for molding, the hot melt processable component being contained at equal to or more than 0.1% by weight but less than 20% by weight of the total weight of the material for molding, and the non-hot melt processable component that is not fibrillated being at least one of low molecular weight polytetrafluoroethylene, a thermosetting resin, and an inorganic filler.

4. The material for molding according to claim 3, wherein the hot melt processable component that is not fibrillated is at least one of a fluororesin, a silicone, a polystyrene, a polyethylene terephthalate, a polyester, a polyamide, an acrylic resin, an urethane resin, and a mixture thereof.

5. The material for molding according to claim 3, wherein the material for molding is configured to mold a porous membrane usable as a filtering medium of a filter to capture fine particles in fluid.

6. A drawn porous body comprising:
a plurality of fibrils; and
a plurality of knotted portions that are connected to each other by the fibrils,
the fibrils including polytetrafluoroethylene that can be fibrillated,
the knotted portions including polytetrafluoroethylene that can be fibrillated, a non-hot melt processable component that is not fibrillated, and a hot melt processable component with a melting point lower than 320° C. that is not fibrillated,
the non-hot melt processable component that is not fibrillated being contained in a range of 20 to 40% by weight of a total weight of the drawn porous body, and
the hot melt processable component being contained at equal to or more than 0.1% by weight but less than 20% by weight of the total weight of the drawn porous body.

7. The drawn porous body according to claim 6, wherein the drawn porous body is a porous membrane usable as a filtering medium of a filter to capture fine particles in fluid.

* * * * *